US012652654B2

(12) United States Patent
Vasisht et al.

(10) Patent No.: US 12,652,654 B2
(45) Date of Patent: Jun. 9, 2026

(54) CHANNEL PREDICTION FOR MIMO SYSTEMS BASED ON RECIPROCITY

(71) Applicant: THE BOARD OF TRUSTEES OF THE UNIVERSITY OF ILLINOIS, Urbana, IL (US)

(72) Inventors: Deepak Vasisht, Urbana, IL (US); Gagandeep Singh, Urbana, IL (US); Zikun Liu, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 293 days.

(21) Appl. No.: 18/576,808

(22) PCT Filed: Aug. 5, 2022

(86) PCT No.: PCT/US2022/039520
§ 371 (c)(1),
(2) Date: Jan. 5, 2024

(87) PCT Pub. No.: WO2023/018607
PCT Pub. Date: Feb. 16, 2023

(65) Prior Publication Data
US 2024/0314745 A1       Sep. 19, 2024

Related U.S. Application Data

(60) Provisional application No. 63/232,509, filed on Aug. 12, 2021.

(51) Int. Cl.
*H04W 72/04*        (2023.01)
*G06N 3/0455*       (2023.01)
(Continued)

(52) U.S. Cl.
CPC .......... *H04W 72/04* (2013.01); *G06N 3/0455* (2023.01); *G06N 3/084* (2013.01); *H04L 41/16* (2013.01)

(58) Field of Classification Search
None
See application file for complete search history.

(56) References Cited

U.S. PATENT DOCUMENTS 8,488,537 B2    7/2013   Ko
9,236,998 B2    1/2016   Wang
(Continued)

OTHER PUBLICATIONS

Brennan. 2003. Linear diversity combining techniques. Proc. IEEE 91, 2 (2003), 331-356. https://doi.org/10.1109/JPROC.2002.808163.

(Continued)

*Primary Examiner* — Angela Nguyen
(74) *Attorney, Agent, or Firm* — McDonnell Boehnen Hulbert & Berghoff LLP

(57) ABSTRACT

An example embodiment may involve receiving, at a node of a radio access network, input signals on a plurality of wireless channels, wherein uplink channels in the plurality of wireless channels are respectively associated with downlink channels in the plurality of wireless channels; determining up-link characteristics for the uplink channels; providing, to a trained neural network, the uplink characteristics, wherein the trained neural network was iteratively trained, with a training data set of recorded uplink characteristics and recorded downlink characteristics, to form predictions of the recorded downlink characteristics from the recorded uplink characteristics, wherein the trained neural network includes an encoder that maps the recorded uplink characteristics to latent vector representations, and a decoder that maps the latent vector representations to the predictions; receiving, from the trained neural network, a prediction of downlink characteristics for the downlink channels; and transmitting, on the downlink channels, output signals based on the prediction.

20 Claims, 18 Drawing Sheets

(51) Int. Cl.
  *G06N 3/084*     (2023.01)
  *H04L 41/16*     (2022.01)

(56)                References Cited

U.S. PATENT DOCUMENTS

| | | | | |
|---|---|---|---|---|
| 10,572,830 | B2 | 2/2020 | O'Shea | |
| 10,756,831 | B2 | 8/2020 | Katabi | |
| 11,038,621 | B2 | 6/2021 | Gutman | |
| 11,438,039 | B2 | 9/2022 | Lee | |
| 12,506,552 | B2 * | 12/2025 | Kim | H04B 17/373 |
| 2017/0026847 | A1 | 1/2017 | Farshchian | |
| 2018/0367192 | A1 | 12/2018 | O'Shea et al. | |
| 2020/0266859 | A1 | 8/2020 | Rollins | |
| 2021/0110261 | A1 | 4/2021 | Seunghyun | |
| 2021/0119681 | A1 | 4/2021 | Seo | |
| 2021/0134002 | A1 | 5/2021 | Yao | |
| 2021/0144779 | A1 | 5/2021 | Vahdat | |
| 2022/0294666 | A1 * | 9/2022 | Jeon | H04L 25/0254 |
| 2022/0393729 | A1 | 12/2022 | Lee | |
| 2023/0026606 | A1 | 1/2023 | Yuan | |
| 2023/0035971 | A1 | 2/2023 | Maksym | |

OTHER PUBLICATIONS

He, et al.. 2018. Transmit antenna selection in MIMO wiretap channels: A machine learning approach. IEEE Wireless Communications Letters 7, 4 (2018), 634-637.

Liu, et al., 2014. Wisleep: Contactless sleep monitoring via wifi signals. In 2014 IEEE Real-Time Systems Symposium. IEEE, 346-355.

Marzetta, et al., 2016. Fundamentals of Massive MIMO. Cambridge University Press. https://doi.org/10.1017/CBO9781316799895.

Min, et al., 2007. MIMO-OFDM downlink channel prediction for IEEE802. 16e systems using Kalman filter. In 2007 IEEE Wireless Communications and Networking Conference. IEEE, 942-946.

Papazafeiropoulos, et al. 2014. Linear precoding for downlink massive MIMO with delayed CSIT and channel prediction. In 2014 IEEE Wireless Communications and Networking Conference (WCNC). IEEE, 809-914.

Pati, et al., 2020. A Novel Machine Learning Approach for Link Adaptation in 5G Wireless Networks. In 2020 2nd PhD Colloquium on Ethically Driven Innovation and Technology for Society (PhD EDITS). 1-2. https://doi. org/10.1109/PhDEDITS51180.2020. 9315299.

Peng, et al., 2019. Downlink channel prediction for time-varying FDD massive MIMO systems. IEEE Journal of Selected Topics in Signal Processing 13, 5 (2019), 1090-1102.

Sthapit, et al., 2018. Bluetooth based indoor positioning using machine learning algorithms. In 2018 IEEE International Conference on Consumer Electronics-Asia (ICCE-Asia). IEEE, 206-212.

Yang, et al., 2019. A machine learning enabled MAC framework for heterogeneous Internet-of-Things networks. IEEE Transactions on Wireless Communications 18, 7 (2019), 3697-3712.

International Search Report and Written Opinion, PCT Application PCT/US2022/39520, mailed Nov. 4, 2022.

5G NR Frequency Bands. https://en.wikipedia.org/wiki/5G_NR_frequency_bands, 2021.

5G; NR; Physical channels and modulation. Technical Specification 38.211, ver. 15.3. 0 (2018).

Adib, et al., 2014. 3d tracking via body radio reflections. In 11th {USENIX} Symposium on Networked Systems Design and Implementation ({NSDI} 14). 317-329.

Alrabeiah, et al., 2019. Deep learning for TDD and FDD massive MIMO: Mapping channels in space and frequency. In 2019 53rd Asilomar Conference on Signals, Systems, and Computers. IEEE, 1465-1470.

Alsheikh, et al., 2014. Machine learning in wireless sensor networks: Algorithms, strategies, and applications. IEEE Communications Surveys & Tutorials 16, 4 (2014), 1996-2018.

Ayyalasomayajula, et al., 2020. Deep learning based wireless localization for indoor navigation. In Proceedings of the 26th Annual International Conference on Mobile Computing and Networking. 1-14.

Bakshi, et al., 2019. Fast and Efficient Cross Band Channel Prediction Using Machine Learning. In The 25th Annual International Conference on Mobile Computing and Networking. 1-16.

Binti Zubir, et al., 2017. Optimization of wireless sensor networks MAC protocols using machine learning; a survey. In 2017 International Conference on Engineering Technology and Technopreneurship (ICE2T). IEEE, 1-5.

Björnson, et al., 2016. Massive MIMO: Ten myths and one critical question. IEEE Communications Magazine 54, 2 (2016), 114-123.

Bonati, et al., 2020. Open, Programmable, and Virtualized 5G Networks: State-of-the-Art and the Road Ahead. Computer Networks 182 (Dec. 2020), 1-28.

Bozkurt, et al., 2015. A comparative study on machine learning algorithms for indoor positioning. In 2015 International Symposium on Innovations in Intelligent Systems and Applications (INISTA). IEEE, 1-8.

Breen, et al. 2020. POWDER: Platform for Open Wireless Data-driven Experimental Research. In Proceedings of the 14th International Workshop on Wireless Network Testbeds, Experimental evaluation & Characterization. 17-24.

Daniels, et al., 2009. Adaptation in convolutionally coded MIMO-OFDM wireless systems through supervised learning and SNR ordering. IEEE Transactions on vehicular Technology 59, 1 (2009), 114-126.

Evolved Universal Terrestrial Radio Access (E-UTRA); Radio Resource Control (RRC); Protocol specification. Technical Specification (TS). 3rd Generation Partnership Project (3GPP), 2021.

Flordelis, et al., 2015. Spatial separation of closely-spaced users in measured massive multi-user MIMO channels. In 2015 IEEE International Conference on Communications (ICC). IEEE, 1441-1446.

Gao, et al., 2011. Linear Pre-Coding Performance in Measured Very-Large MIMO Channels. In 2011 IEEE Vehicular Technology Conference (VTC Fall). 1-5. https://doi.org/10.1109/VETECF.2011. 6093291.

Higgins, et al.,2016. beta-vae: Learning basic visual concepts with a constrained variational framework. (2016).

Hinton, et al., 1993. Autoencoders, Minimum Description Length and Helmholtz Free Energy. In Proc. Neural Information Processing Systems (NeurIPS). 3-10.

Hu, et al,. 2017. Toward Controlled Generation of Text. In Proc. International Conference on Machine Learning (ICML), vol. 70. PMLR, 1587-1596.

Huang, et al., 2019. Deep learning for UL/DL channel calibration in generic massive MIMO systems. In ICC 2019-2019 IEEE International Conference on Communications (ICC). IEEE, 1-6.

Hugl, et al. 2002. Spatial reciprocity of uplink and downlink radio channels in FDD systems. In Proc. COST, vol. 273. Citeseer, 066.

Jog, et al., One Protocol to Rule Them All: Wireless Network-on-Chip using Deep Reinforcement Learning, 18th USENIX Symposium on Networked Systems Design and Implementation (NSDI 21), 2021, pp. 973-989.

Kaltenberger, et al., 2008. Performance of multi-user MIMO precoding with limited feedback over measured channels. In IEEE Globecom 2008-2008 IEEE Global Telecommunications Conference. IEEE, 1-5.

Kingma et al., 2013. Auto-encoding variational bayes. arXiv preprint arXiv:1312.6114 (2013).

Kipf, et al., 2016. Variational Graph Auto-Encoders. CoRR abs/ 1611.07308 (2016). http://arxiv.org/abs/1611.07308.

Klautau, et al., 2018. 5G MIMO data for machine learning: Application to beam-selection using deep learning. In 2018 Information Theory and Applications Workshop (ITA). IEEE, 1-9.

Kulkarni, et al. 2015. Deep Convolutional Inverse Graphics Network. In Proc. Neural Information Processing Systems (NeurIPS). 2539-2547.

Liu, et al., 2019. CBNVAE: A data compression model with efficient convolutional structure for wireless sensor networks. Sensors 19, 16 (2019), 3445.

(56)             References Cited

OTHER PUBLICATIONS

Maas, et al., 2013. Rectifier nonlinearities improve neural network acoustic models. In Proc. ICML, vol. 30. Citeseer, 3.

Martínez, et al., 2014. Towards very large aperture massive MIMO: A measurement based study. In 2014 IEEE Globecom Workshops (GC Wkshps). IEEE, 281-286.

Marzetta. 2010. Noncooperative Cellular Wireless with Unlimited Numbers of Base Station Antennas. IEEE Transactions on Wireless Communications 9, 11 (2010), 3590-3600. https://doi.org/10.1109/TWC.2010.092810.091092.

Mathieu, et al., Disentangling Disentanglement in Variational Autoencoders. Proceedings of the 36th International Conference on Machine Learning, PMLR 97:4402-4412, 2019.

McInnes, et al., 2018. Umap: Uniform manifold approximation and projection for dimension reduction. arXiv preprint arXiv:1802.03426 (2018).

Mehlführer, et al., 2011. The Vienna LTE simulators-Enabling reproducibility in wireless communications research. EURASIP Journal on Advances in Signal Processing 2011, 1 (2011), 1-14.

NTT Docomo. 2016. New SID proposal: study on new radio access technology. In 3GPP TSG RAN Meeting, vol. 71. 7-10.

O'Shea, et al., 2017. Deep learning based MIMO communications. arXiv preprint arXiv:1707.07980 (2017).

Paszke, et al., 2017. Automatic differentiation in pytorch. (2017), https://openreview.net/pdf?id=BJJsrmfCZ.

Physical layer procedures for data (3GPP TS 38.214 version 16.2.0 Release 16). (2020).

Qualcomm Inc. 2020. Global Update on Spectrum for 4G & 5G. https://en.wikipedia.org/wiki/5G_NR_frequency_bands.

Safari, et al., 2019. Deep UL2DL: Data-driven channel knowledge transfer from uplink to downlink. IEEE Open Journal of Vehicular Technology 1 (2019), 29-44.

Shepard, et al., 2012. Argos: Practical Many-Antenna Base Stations. In Proceedings of the 18th Annual International Conference on Mobile Computing and Networking (Istanbul, Turkey) (Mobicom '12). Association for Computing Machinery, New York, NY, USA, 53-64. https://doi.org/10.1145/2348543.2348553.

Shepard, et al., 2016. Understanding real many-antenna MU-MIMO channels. In 2016 50th Asilomar Conference on Signals, Systems and Computers. IEEE, 461-467.

Skatchkovsky, et al., 2020. End-to-End Learning of Neuromorphic Wireless Systems for Low-Power Edge Artificial Intelligence. arXiv preprint arXiv:2009.01527 (2020).

T-Mobile exec touts massive MIMO for both TDD and FDD bands. https://www.fiercewireless.com/tech/t-mobile-exec-saysmassive-mimo-can-be-used-tdd-and-fdd-bands, 2020.

Vasisht, et al., 2016. Eliminating channel feedback in next-generation cellular networks. In Proceedings of the 2016 ACM SIGCOMM Conference. 398-411.

Yang, et al., 2019. Adaptive spatial modulation MIMO based on machine learning. IEEE Journal on Selected Areas in Communications 37, 9 (2019), 2117-2131.

Yang, et al., 2019. Deep learning-based downlink channel prediction for FDD massive MIMO system. IEEE Communications Letters 23, 11 (2019), 1994-1998.

Yang, et al., 2020. Deep Transfer Learning-Based Downlink Channel Prediction for FDD Massive MIMO Systems. IEEE Transactions on Communications 68, 12 (2020), 7485-7497.

Zhao, et al. 2018. Throughwall human pose estimation using radio signals. In Proceedings of the IEEE Conference on Computer Vision and Pattern Recognition. 7356-7365.

Zhao, et al., 2018. RF-based 3D skeletons. In Proceedings of the 2018 Conference of the ACM Special Interest Group on Data Communication. 267-281.

\* cited by examiner

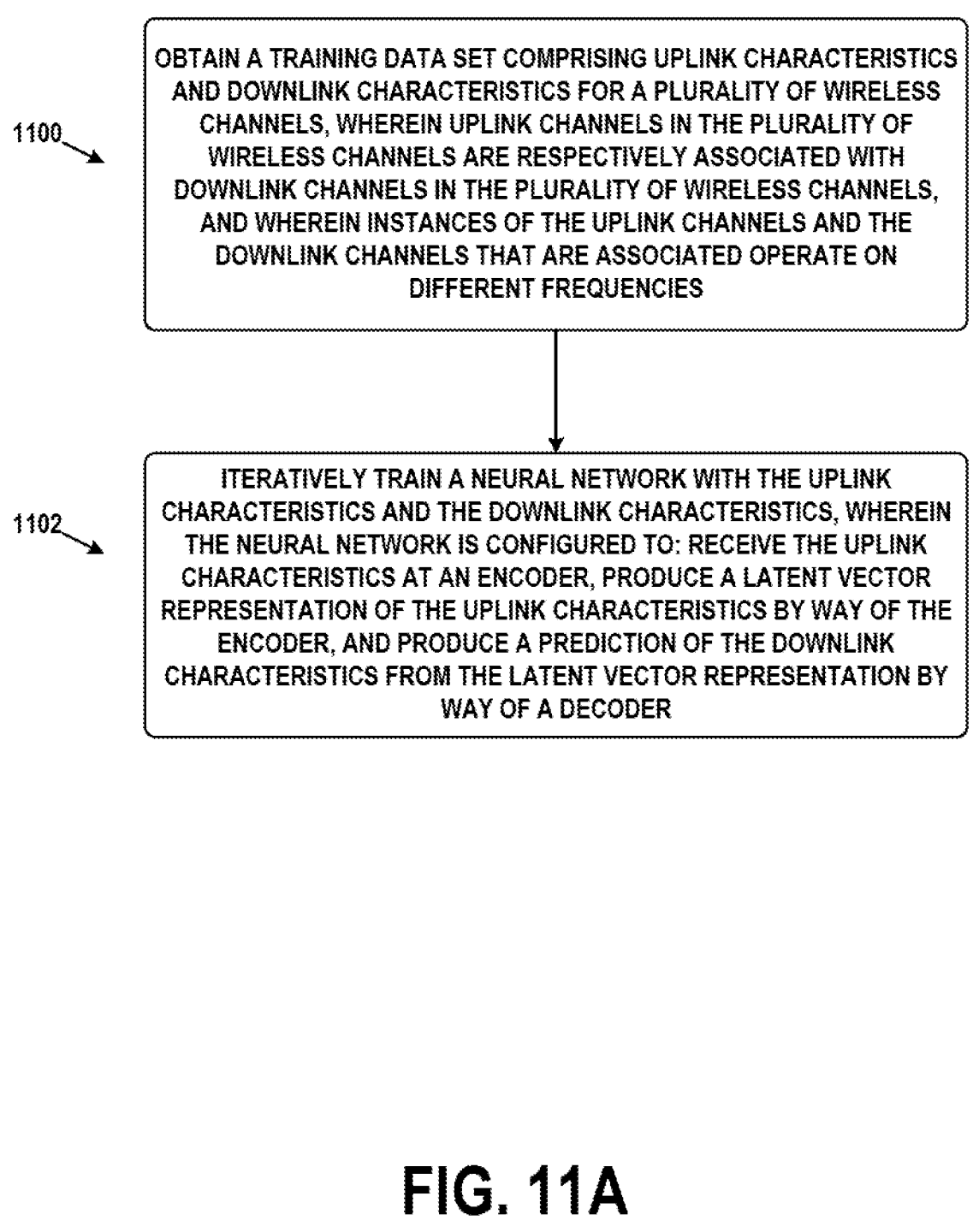

1100

OBTAIN A TRAINING DATA SET COMPRISING UPLINK CHARACTERISTICS AND DOWNLINK CHARACTERISTICS FOR A PLURALITY OF WIRELESS CHANNELS, WHEREIN UPLINK CHANNELS IN THE PLURALITY OF WIRELESS CHANNELS ARE RESPECTIVELY ASSOCIATED WITH DOWNLINK CHANNELS IN THE PLURALITY OF WIRELESS CHANNELS, AND WHEREIN INSTANCES OF THE UPLINK CHANNELS AND THE DOWNLINK CHANNELS THAT ARE ASSOCIATED OPERATE ON DIFFERENT FREQUENCIES

1102

ITERATIVELY TRAIN A NEURAL NETWORK WITH THE UPLINK CHARACTERISTICS AND THE DOWNLINK CHARACTERISTICS, WHEREIN THE NEURAL NETWORK IS CONFIGURED TO: RECEIVE THE UPLINK CHARACTERISTICS AT AN ENCODER, PRODUCE A LATENT VECTOR REPRESENTATION OF THE UPLINK CHARACTERISTICS BY WAY OF THE ENCODER, AND PRODUCE A PREDICTION OF THE DOWNLINK CHARACTERISTICS FROM THE LATENT VECTOR REPRESENTATION BY WAY OF A DECODER

FIG. 11A

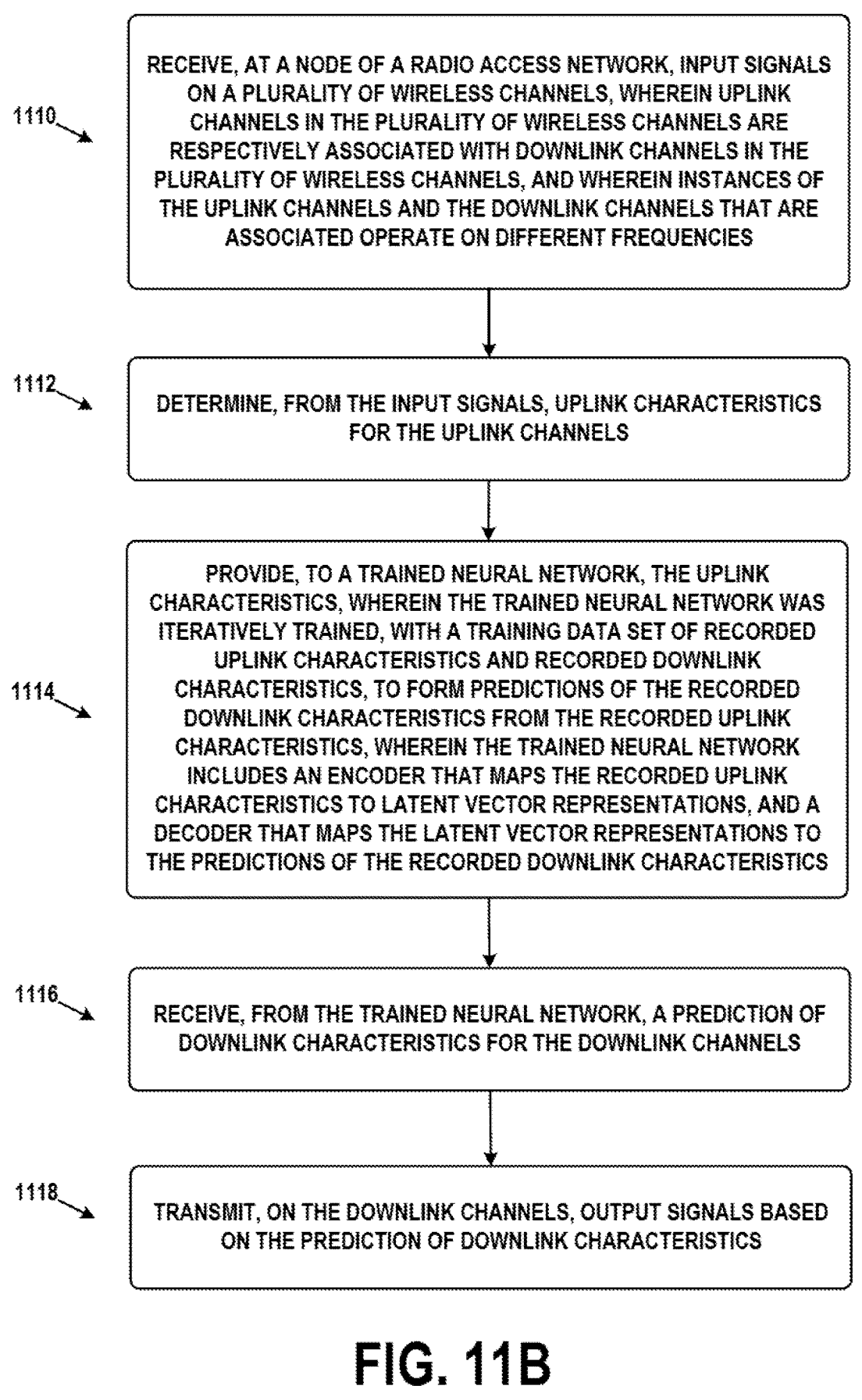

1110 → RECEIVE, AT A NODE OF A RADIO ACCESS NETWORK, INPUT SIGNALS ON A PLURALITY OF WIRELESS CHANNELS, WHEREIN UPLINK CHANNELS IN THE PLURALITY OF WIRELESS CHANNELS ARE RESPECTIVELY ASSOCIATED WITH DOWNLINK CHANNELS IN THE PLURALITY OF WIRELESS CHANNELS, AND WHEREIN INSTANCES OF THE UPLINK CHANNELS AND THE DOWNLINK CHANNELS THAT ARE ASSOCIATED OPERATE ON DIFFERENT FREQUENCIES

1112 → DETERMINE, FROM THE INPUT SIGNALS, UPLINK CHARACTERISTICS FOR THE UPLINK CHANNELS

1114 → PROVIDE, TO A TRAINED NEURAL NETWORK, THE UPLINK CHARACTERISTICS, WHEREIN THE TRAINED NEURAL NETWORK WAS ITERATIVELY TRAINED, WITH A TRAINING DATA SET OF RECORDED UPLINK CHARACTERISTICS AND RECORDED DOWNLINK CHARACTERISTICS, TO FORM PREDICTIONS OF THE RECORDED DOWNLINK CHARACTERISTICS FROM THE RECORDED UPLINK CHARACTERISTICS, WHEREIN THE TRAINED NEURAL NETWORK INCLUDES AN ENCODER THAT MAPS THE RECORDED UPLINK CHARACTERISTICS TO LATENT VECTOR REPRESENTATIONS, AND A DECODER THAT MAPS THE LATENT VECTOR REPRESENTATIONS TO THE PREDICTIONS OF THE RECORDED DOWNLINK CHARACTERISTICS

1116 → RECEIVE, FROM THE TRAINED NEURAL NETWORK, A PREDICTION OF DOWNLINK CHARACTERISTICS FOR THE DOWNLINK CHANNELS

1118 → TRANSMIT, ON THE DOWNLINK CHANNELS, OUTPUT SIGNALS BASED ON THE PREDICTION OF DOWNLINK CHARACTERISTICS

FIG. 11B

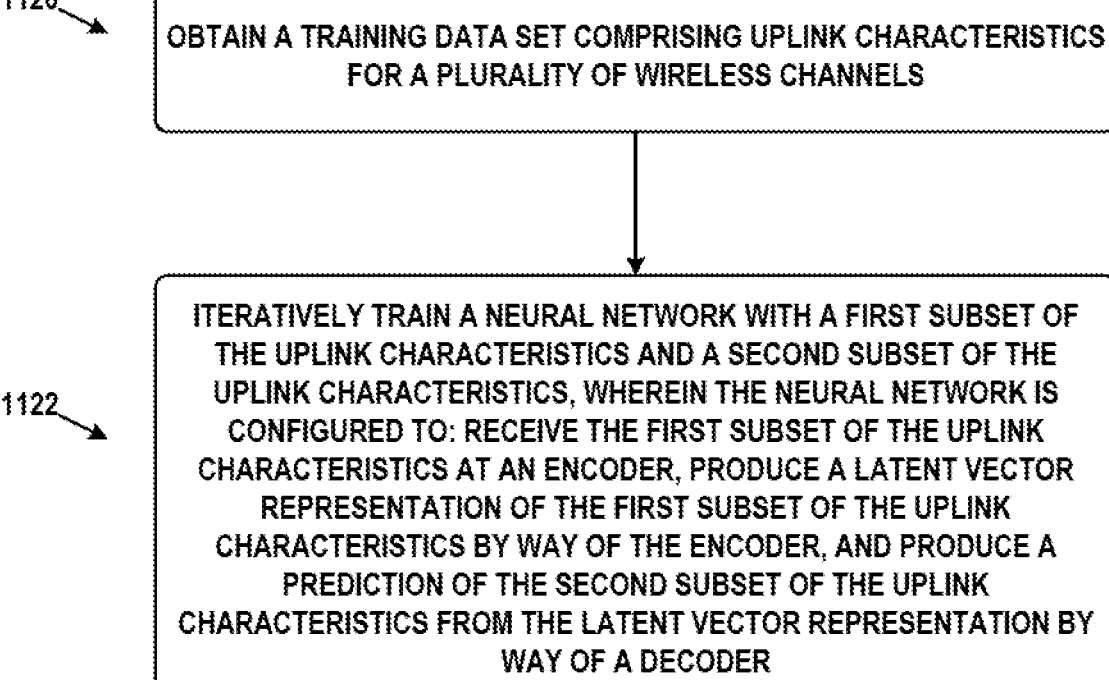

1120

OBTAIN A TRAINING DATA SET COMPRISING UPLINK CHARACTERISTICS FOR A PLURALITY OF WIRELESS CHANNELS

1122

ITERATIVELY TRAIN A NEURAL NETWORK WITH A FIRST SUBSET OF THE UPLINK CHARACTERISTICS AND A SECOND SUBSET OF THE UPLINK CHARACTERISTICS, WHEREIN THE NEURAL NETWORK IS CONFIGURED TO: RECEIVE THE FIRST SUBSET OF THE UPLINK CHARACTERISTICS AT AN ENCODER, PRODUCE A LATENT VECTOR REPRESENTATION OF THE FIRST SUBSET OF THE UPLINK CHARACTERISTICS BY WAY OF THE ENCODER, AND PRODUCE A PREDICTION OF THE SECOND SUBSET OF THE UPLINK CHARACTERISTICS FROM THE LATENT VECTOR REPRESENTATION BY WAY OF A DECODER

FIG. 11C

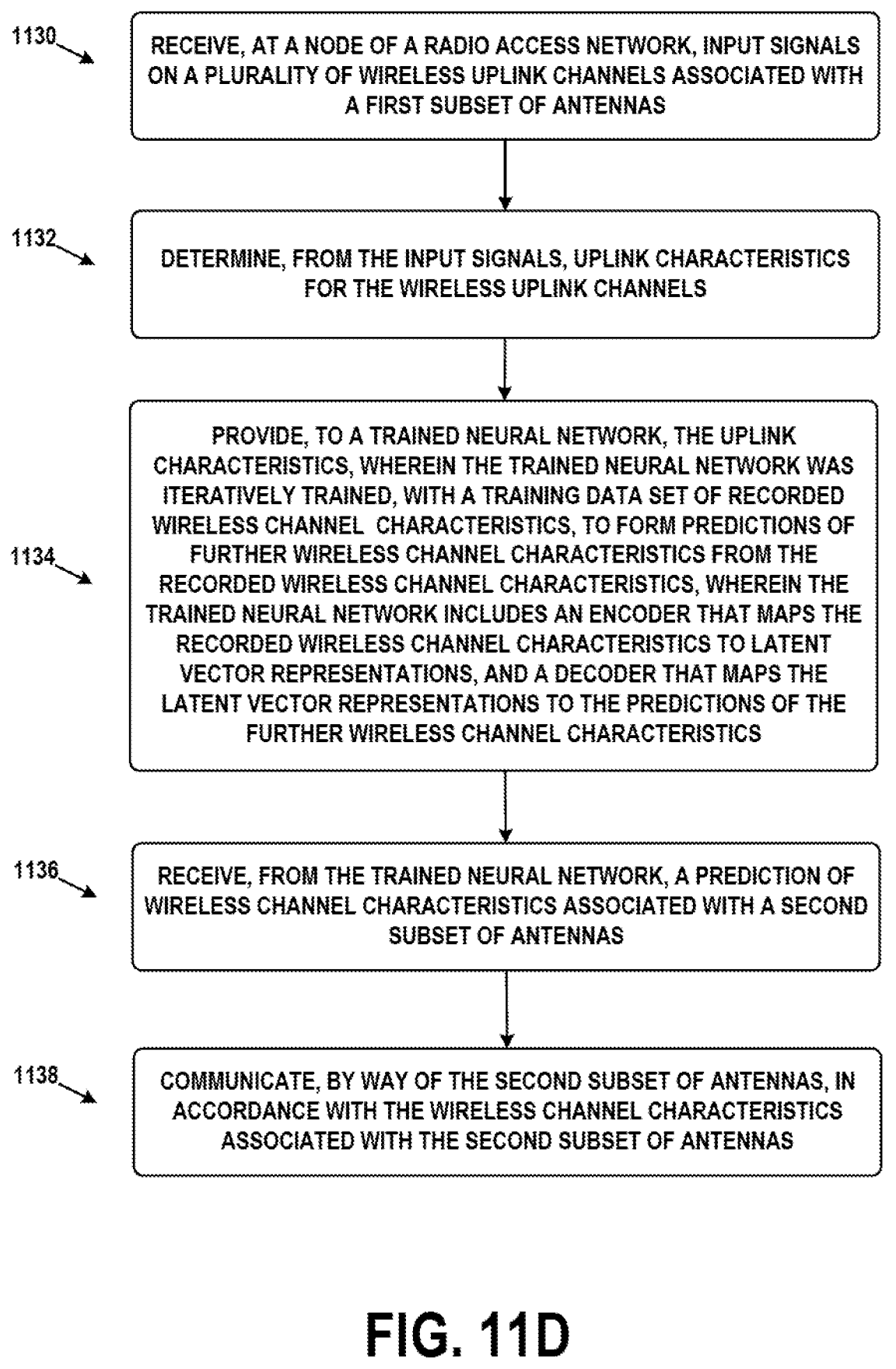

1130 ↘
```
RECEIVE, AT A NODE OF A RADIO ACCESS NETWORK, INPUT SIGNALS
ON A PLURALITY OF WIRELESS UPLINK CHANNELS ASSOCIATED WITH
A FIRST SUBSET OF ANTENNAS
```

1132 ↘
```
DETERMINE, FROM THE INPUT SIGNALS, UPLINK CHARACTERISTICS
FOR THE WIRELESS UPLINK CHANNELS
```

1134 ↘
```
PROVIDE, TO A TRAINED NEURAL NETWORK, THE UPLINK
CHARACTERISTICS, WHEREIN THE TRAINED NEURAL NETWORK WAS
ITERATIVELY TRAINED, WITH A TRAINING DATA SET OF RECORDED
WIRELESS CHANNEL CHARACTERISTICS, TO FORM PREDICTIONS OF
FURTHER WIRELESS CHANNEL CHARACTERISTICS FROM THE
RECORDED WIRELESS CHANNEL CHARACTERISTICS, WHEREIN THE
TRAINED NEURAL NETWORK INCLUDES AN ENCODER THAT MAPS THE
RECORDED WIRELESS CHANNEL CHARACTERISTICS TO LATENT
VECTOR REPRESENTATIONS, AND A DECODER THAT MAPS THE
LATENT VECTOR REPRESENTATIONS TO THE PREDICTIONS OF THE
FURTHER WIRELESS CHANNEL CHARACTERISTICS
```

1136 ↘
```
RECEIVE, FROM THE TRAINED NEURAL NETWORK, A PREDICTION OF
WIRELESS CHANNEL CHARACTERISTICS ASSOCIATED WITH A SECOND
SUBSET OF ANTENNAS
```

1138 ↘
```
COMMUNICATE, BY WAY OF THE SECOND SUBSET OF ANTENNAS, IN
ACCORDANCE WITH THE WIRELESS CHANNEL CHARACTERISTICS
ASSOCIATED WITH THE SECOND SUBSET OF ANTENNAS
```

FIG. 11D

CHANNEL PREDICTION FOR MIMO SYSTEMS BASED ON RECIPROCITY

CROSS REFERENCE TO RELATED APPLICATION

This application is a U.S. National Phase of International Application No. PCT/US2022/039520, filed Aug. 5, 2022, which claims priority to U.S. Provisional Application No. 63/232,509, filed Aug. 12, 2021, both of which are incorporated by reference herein in their entirety.

BACKGROUND

Multiple-input multiple-output (MIMO) wireless technologies typically employ arrays of transmitting and receiving antennas, and utilize multipath propagation to increase the capacity of wireless links. Large-scale MIMO forms a crucial component for fifth generation (5G) wireless networks because of its ability to improve quality of service and support multiple streams simultaneously. However, for real-world MIMO deployments, estimating the downlink wireless channel (from the network to client devices) from each antenna on the base station to every client device is a critical bottleneck, especially for the widely used frequency duplexed (FDD) designs that cannot utilize reciprocity. Typically, this channel estimation requires explicit uplink feedback (from client devices to the network) and is prohibitive for large antenna deployments.

SUMMARY

The embodiments herein present a system that uses an end-to-end machine learning approach to enable accurate channel estimation without requiring any feedback from client devices. These embodiments, as implemented in systems or devices, as well as by way of various techniques, methods, and/or algorithms, are referred to as FIRE (FDD Interpretable REciprocity). FIRE is interpretable, accurate, and has low compute overhead. It is shown that FIRE can successfully support MIMO transmissions in a real-world testbed and achieves signal-to-noise ratio (SNR) improvement over 10 dB in MIMO transmissions compared to the current state-of-the-art.

Accordingly, a first example embodiment may involve obtaining a training data set comprising uplink characteristics and downlink characteristics for a plurality of wireless channels, wherein uplink channels in the plurality of wireless channels are respectively associated with downlink channels in the plurality of wireless channels, and wherein instances of the uplink channels and the downlink channels that are associated operate on different frequencies. The first example embodiment may also involve iteratively training a neural network with the uplink characteristics and the downlink characteristics, wherein the neural network is configured to: receive the uplink characteristics at an encoder, produce a latent vector representation of the uplink characteristics by way of the encoder, and produce a prediction of the downlink characteristics from the latent vector representation by way of a decoder.

A second example embodiment may involve receiving, at a node of a radio access network, input signals on a plurality of wireless channels, wherein uplink channels in the plurality of wireless channels are respectively associated with downlink channels in the plurality of wireless channels, and wherein instances of the uplink channels and the downlink channels that are associated operate on different frequencies.

The second example embodiment may also involve determining, from the input signals, uplink characteristics for the uplink channels. The second example embodiment may also involve providing, to a trained neural network, the uplink characteristics, wherein the trained neural network was iteratively trained, with a training data set of recorded uplink characteristics and recorded downlink characteristics, to form predictions of the recorded downlink characteristics from the recorded uplink characteristics, wherein the trained neural network includes an encoder that maps the recorded uplink characteristics to latent vector representations, and a decoder that maps the latent vector representations to the predictions of the recorded downlink characteristics. The second example embodiment may also involve receiving, from the trained neural network, a prediction of downlink characteristics for the downlink channels. The second example embodiment may also involve transmitting, on the downlink channels, output signals based on the prediction of downlink characteristics.

A third example embodiment may involve obtaining a training data set comprising uplink characteristics for a plurality of wireless channels. The third example embodiment may also involve iteratively training a neural network with a first subset of the uplink characteristics and a second subset of the uplink characteristics, wherein the neural network is configured to: receive the first subset of the uplink characteristics at an encoder, produce a latent vector representation of the first subset of the uplink characteristics by way of the encoder, and produce a prediction of the second subset of the uplink characteristics from the latent vector representation by way of a decoder.

A fourth example embodiment may involve receiving, at a node of a radio access network, input signals on a plurality of wireless uplink channels associated with a first subset of antennas. The fourth example embodiment may also involve determining, from the input signals, uplink characteristics for the wireless uplink channels. The fourth example embodiment may also involve providing, to a trained neural network, the uplink characteristics, wherein the trained neural network was iteratively trained, with a training data set of recorded wireless channel characteristics, to form predictions of further wireless channel characteristics from the recorded wireless channel characteristics, wherein the trained neural network includes an encoder that maps the recorded wireless channel characteristics to latent vector representations, and a decoder that maps the latent vector representations to the predictions of the further wireless channel characteristics. The fourth example embodiment may also involve receiving, from the trained neural network, a prediction of wireless channel characteristics associated with a second subset of antennas. The fourth example embodiment may also involve communicating, by way of the second subset of antennas, in accordance with the wireless channel characteristics associated with the second subset of antennas.

In a fifth example embodiment, an article of manufacture may include a non-transitory computer-readable medium, having stored thereon program instructions that, upon execution by a computing system, cause the computing system to perform operations in accordance with the first, second, third and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third and/or fourth example embodiment.

In a seventh example embodiment, a system may include various means for carrying out each of the operations of the first, second, third and/or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 11A is a flow chart, in accordance with an example embodiment.

FIG. 11B is another flow chart, in accordance with an example embodiment.

FIG. 11C is another flow chart, in accordance with an example embodiment.

FIG. 11D is another flow chart, in accordance with an example embodiment.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Herein, the terms "client", "mobile", "client device", "mobile device", "smart device", "wireless device", and so on may refer to a device that is configured with one or more wireless transceivers and antennas, and that uses these components to gain access to a wireless network. Similarly, the terms "server", "server device", "base station", "radio device", "network device", and so on may refer to a device that is configured to provide wireless access to client devices by way of a wireless network. Through the wireless network, client devices may gain access to local area networks (LANs) or wide-area networks (WANs), the Internet being an example of the latter.

I. Example Computing Devices and Cloud-Based Computing Environments

Figure 1:
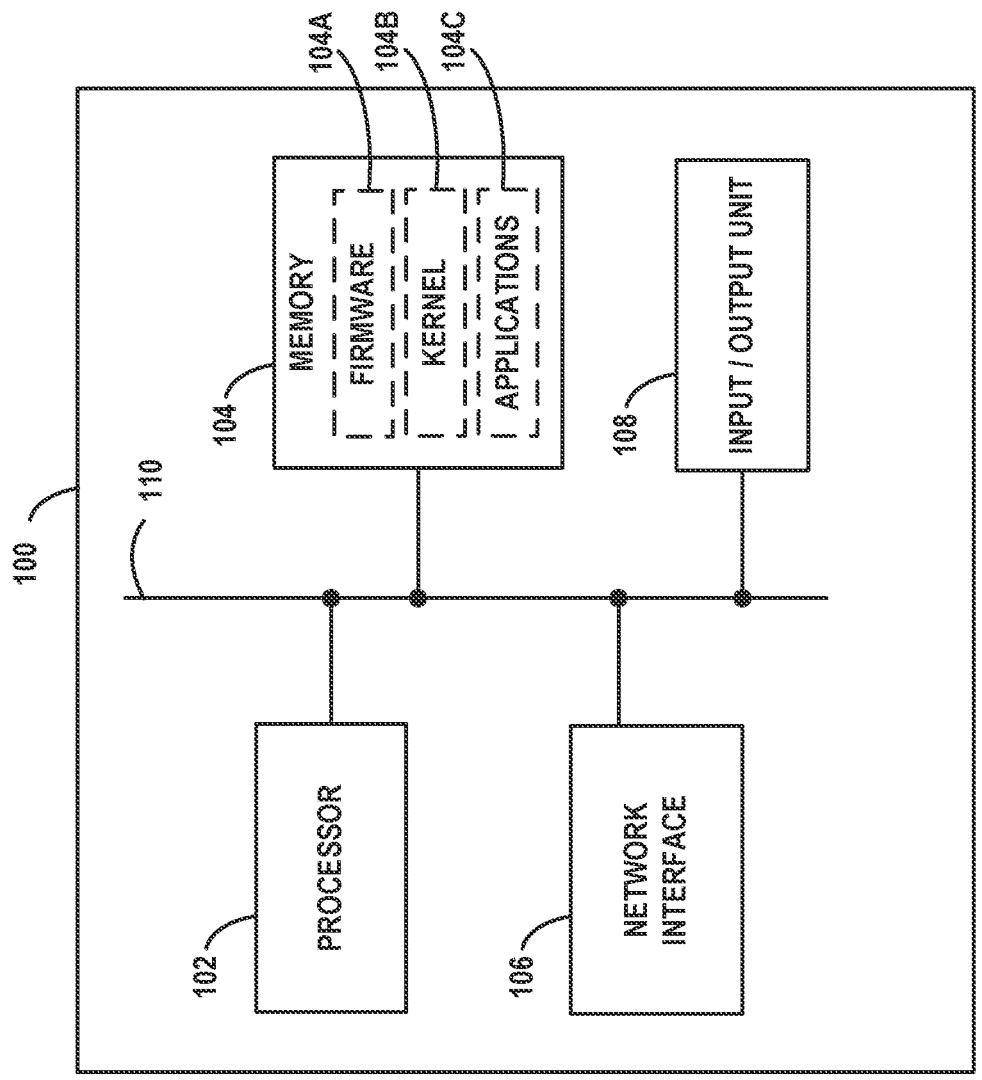
FIG. 1 depicts a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries (e.g., scheduling algorithms and/or random number generators) used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media. Network interface 106 may additionally take the form of one or more wireless interfaces, such as IEEE 802.11 (Wifi), BLUETOOTH®, global positioning system (GPS), or a wide-area wireless interface (e.g., MIMO-based 5G). However, other forms of physical layer interfaces and other types of standard or proprietary communication protocols may be used over network interface 106. Furthermore, network interface 106 may comprise multiple physical interfaces. For the embodiments herein, it is assumed that client devices and base station each have at least one wireless interface capable of MIMO-based 5G. But other arrangements are possible, including the distribution of at least some channel estimation procedures to remote devices outside of a radio network.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

To the end of distributing channel estimation procedures beyond the radio network, one or more computing devices like computing device 100 may be deployed to support the embodiments herein. The exact physical location, connectivity, and configuration of these computing devices may be unknown and/or unimportant to client devices. Accordingly, the computing devices may be referred to as "cloud-based" devices that may be housed at various remote data center locations.

Figure 2:
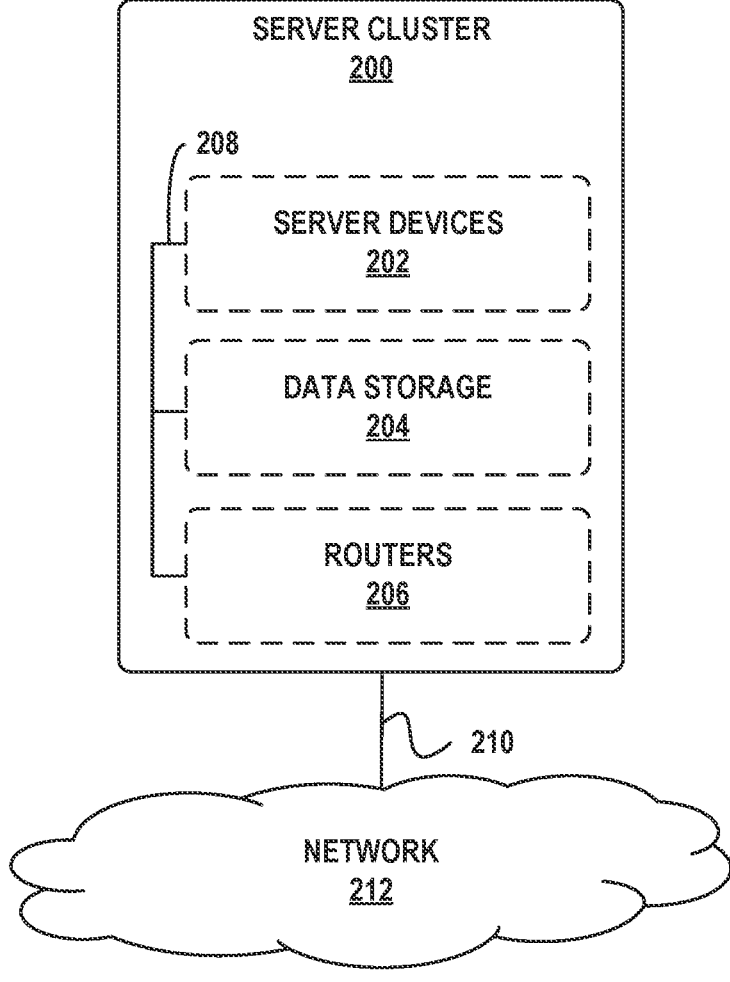
FIG. 2 depicts a cloud-based computing infrastructure, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

Additionally, server devices 202 may be configured to carry out various types of machine learning training and/or execution tasks, such as those described below. Thus, server devices 202 may be able to train various types of machine learning models with corpuses of data, as well as execute these models on new observations including those made in live operation of a wireless system.

II. Example Wireless Networking System

Figure 3:
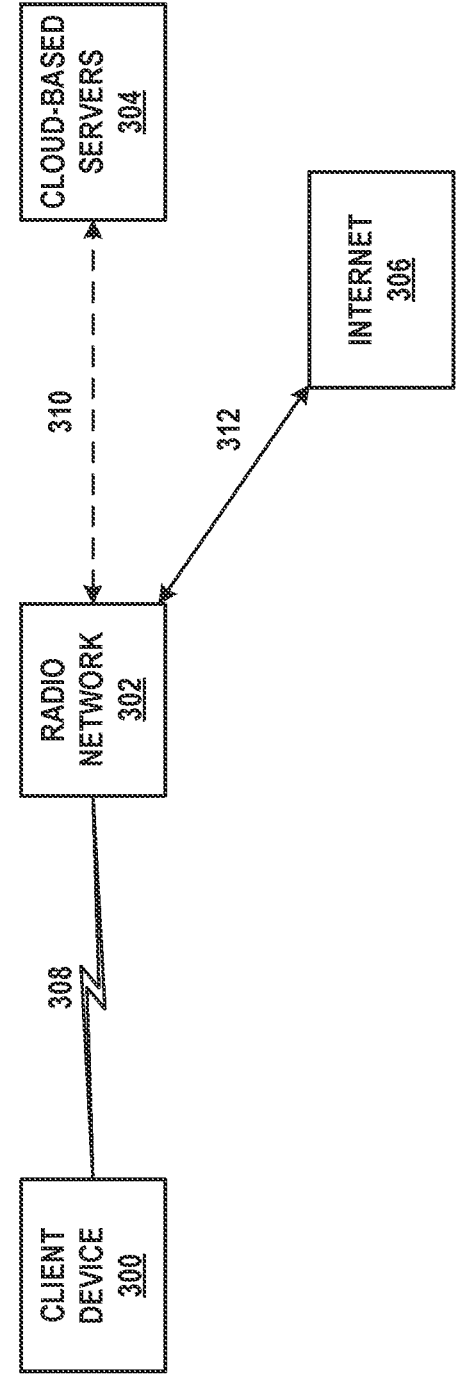
FIG. 3 depicts a radio network and its connectivity to other systems and devices, in accordance with example embodiments.
Figure 3:

FIG. 3 depicts a schematic of an example wireless networking system, in accordance with example embodiments. This system includes client device 300 and radio network 302. Radio network 302 may include one or more base stations, base station controllers, authentication servers, policy servers, gateways, routers, and so on.

Radio network 302 can be configured to use one or more of cloud-based servers 304 for offloading certain types of processing (e.g., machine learning model training and/or execution). Radio network 302 may also be configured to provide access to Internet 306 for client device 300. Here, Internet 306 includes any type of packet-switched network, including the public Internet.

Wireless link 308 may be a MIMO-based 5G air interface. As such, client device 300 and/or radio network 302 may employ respective arrays of antennas to facilitate multi-path features for spatial multiplexing in addition to the time and frequency multiplexing provided by orthogonal frequency-division multiplexing (OFDM), for example. Each antenna may be individually controlled and contain transceiver components. In client device 300, the antenna arrays may be built into the physical structure of the device. In radio network 302, one or more base stations may house such antenna arrays, in some cases 16, 32, 64, 128, or more antennas per array.

The radio frequency spectrum used by 5G networks is typically divided into bands, with one band from 450 MHz to 6 GHz and another band from 24.25 GHz to 52.6 GHz. However, other bands may be possible.

Regardless of the exact arrangement, radio network 302 may optionally communicate with cloud-based servers 304 by way of link 310 for purposes of channel estimation. Alternatively, all channel estimation procedures may take place within one or more nodes of radio network 302. Further, radio network 302 may provide access to Internet 306 by way of link 312. Links 310 and 312 may be wireline or wireless links.

Thus, transmissions from client device 300 to a correspondent node (not shown) accessible by way of Internet 306 may flow from client device 300, over link 308, through radio network 302, over link 312, and across Internet 306. Likewise, transmissions to client device 300 from the correspondent node may flow from the correspondent node, across Internet 306, over link 312, through radio network 302, and over link 308.

III. Example Neural Networks

While the embodiments herein focus on the use of encoder/decoder neural networks with MIMO-based 5G, this section provides an illustrative overview of neural networks in general. Such an overview may be helpful in appreciating the improvements provided by these embodiments.

A neural network is a computational model in which a number of simple units, working individually, in parallel, and often without central control, combine to solve complex problems. While this model may resemble an animal's brain in some respects, analogies between neural networks and brains are tenuous at best. Modern neural networks have a fixed structure, a mathematical learning process, are usually trained to solve one problem at a time, and are much smaller than their biological counterparts.

A neural network is represented as a number of nodes that are arranged into a number of layers, with connections between the nodes of adjacent layers. The description herein generally applies to a feed-forward multilayer neural network, but similar structures and principles are used in convolutional neural networks, recurrent neural networks, graph neural networks, and recursive neural networks, for example.

Input values are introduced to the first layer of the neural network (the input layer), traverse some number of hidden layers, and then traverse an output layer that provides output values. A neural network may be a fully-connected network, in that nodes of each layer aside from the input layer receive input from all nodes in the previous layer. But partial connectivity between layers is also possible.

Connections between nodes represent paths through which intermediate values flow, and are each associated with a respective weight that is applied to the respective intermediate value. Each node performs an operation on its received values and their associated weights (e.g., values between 0 and 1, inclusive) to produce an output value. In some cases this operation may involve a dot-product sum of the products of each input value and associated weight. An activation function (e.g., a sigmoid, tanh or ReLU function) may be applied to the result of the dot-product sum to produce a scaled output value. Other operations are possible Training a neural network usually involves providing the neural network with some form of supervisory training data, namely sets of input values and desired, or ground truth, output values. The training process involves applying the input values from such a set to the neural network and producing associated output values. A loss function is used to evaluate the error between the produced output values and the ground truth output values. This loss function may be a sum of differences, mean squared error, or some other metric. In some cases, error values are determined for all of the sets of input values, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through the neural network in a fashion that results in a lower error for future iterations of the training data.

The training process continues applying the training data to the neural network until the weights converge. Convergence occurs when the error is less than a threshold value or the change in the error is sufficiently small between consecutive iterations of training. At this point, the neural network is said to be "trained" and can be applied to new sets of input values in order to predict output values that are unknown.

Most training techniques for the neural network make use of some form of backpropagation. Backpropagation distributes the error one layer at a time, from the output layer, through the hidden layers and to the input layer. Thus, the weights of the connections between the last hidden layer and the output layer are updated first, the weights of the connections between second-to-last hidden layer and last hidden layer are updated second, and so on. This updating can be based on a partial derivative of the activation function for each node and that node's connectivity to other nodes. Backpropagation completes when all weights have been updated.

In some cases, various hyperparameters can be used to adjust the learning of the neural network. For example, constant biases can be applied to the dot-product sums on a per layer basis. Further, a multiplicative learning rate, or gain, could be applied when weights are updated. Other possibilities exist.

Once trained, the neural network can be given new input values and produce corresponding output values that reflect what the neural network has learned by way of training. These output values may be predictions or classifications based on the input values.

While the discussion above assumes supervised training, training processes can also be unsupervised. For instance, given a corpus of data, a neural network can learn mappings from this data to real-valued vectors in such a way that resulting vectors are similar for data with similar content. This can be achieved using, for example, encoders that construct the vectors from the data and decoders that approximately reconstruct the data from the vectors, with reconstruction error as a cost function. This process creates meaningful vector representations that can be used for interpretability, for example.

IV. Downlink Channel Estimation Using Uplink Signals

The advent of 5G promises to add new dimensions to cellular communication systems. 5G will support high-capacity, gigabit-per-second communication from client devices and enable low power connectivity for millions of Internet-of-Things devices per square mile. These capabilities are enabled by large bandwidths and MIMO techniques that leverage tens to hundreds of antennas. In 5G, base stations equipped with multiple antennas will leverage advanced signal processing methods to enable a suite of new technologies like multi-user MIMO and coordinated multipoint transmissions to increase the spectral efficiency of cellular networks multifold.

To enable MIMO capabilities, base stations need to know the downlink wireless channel from each of their antennas to every client device (e.g., a smartphone). This is trivially achieved in TDD (Time Domain Duplexing) systems using reciprocity. In TDD systems, the uplink (client to base station) and downlink transmission happen on the same frequency. Therefore, the base station can measure the uplink channel using client transmissions and use reciprocity to infer the downlink channel. Due to reciprocity, the uplink and downlink channels are equal modulo hardware factors. However, in FDD (Frequency Domain Duplexing) systems, dominant in several countries including the United States, the uplink and downlink transmission happen on different frequencies, and therefore the principle of reciprocity no longer applies.

Today, in FDD systems, the client device measures the wireless channel using extra preamble symbols transmitted by the base station and sends it as feedback to the base station. This feedback introduces overhead that scales linearly with the number of antennas and devices, and is prohibitive for massive MIMO systems. As discussed below, the feedback overhead for 64 antenna base stations transmitting to 8 client devices can be as high as 54 Mbps in mobile environments over a 10 MHz channel.

This overhead has been recognized as unsustainable. It has been observed that the uplink and downlink channels are created by the same underlying physical environment and the same paths being travelled. Therefore, signal processing or machine learning models have been proposed to infer the underlying paths using uplink channels measured at the base stations. Then, they use standard models to infer the downlink channel from the paths without any feedback.

However, this computation has proven to be error-prone and can enable only low-accuracy primitives like beamforming but not the more advanced operations like multi-stream MIMO transmission or multi-user MIMO. Therefore, FDD cellular systems today gain limited utility out of multiple antennas due to this tradeoff between channel accuracy and feedback overhead. Accurate channel measurements can enable MIMO gains but have prohibitive overhead. In contrast, zero feedback methods fail to utilize MIMO gains.

Figure 4:
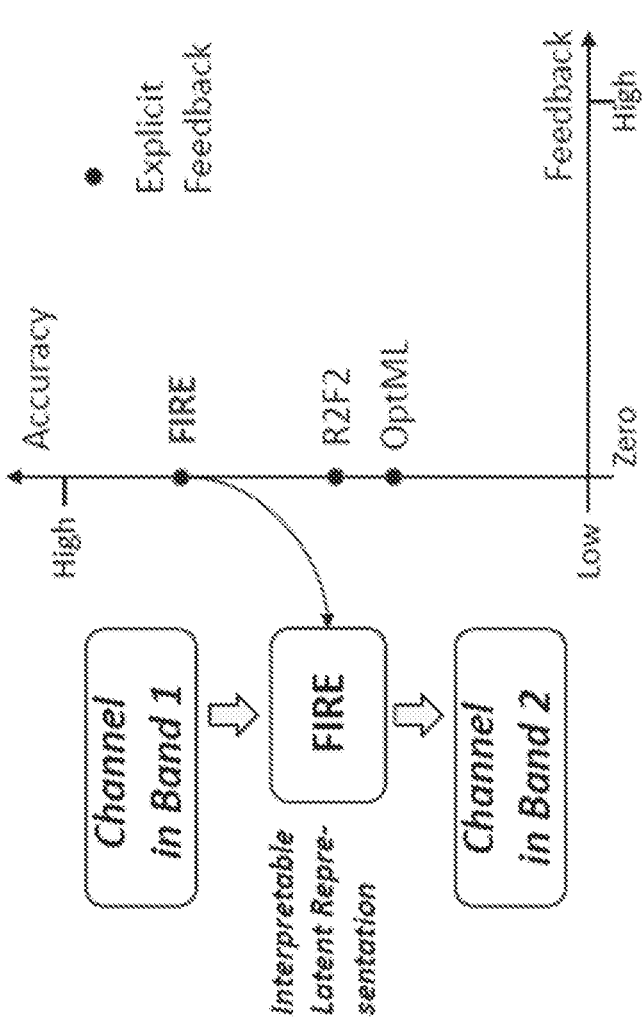
FIG. 4 illustrates model interpretability versus level of feedback, in accordance with example embodiments.

The embodiments herein break the above barrier and achieve high accuracy, zero feedback MIMO operations. The embodiments are generally referred to as FIRE (FDD Interpretable REciprocity)—a system that uses an end-to-end machine learning approach to infer downlink channels from uplink channels without any feedback from the client, as shown in FIG. 4.

It is observed that that past work attempts to solve an unnecessarily challenging problem: to identify the accurate distance, angle, and phase of each path that the signal travels along. Given the limited bandwidth of cellular systems, this approach is likely to fail. However, the downlink channel inference problem is more forgiving. For example, adding the same distance to all paths doesn't change the relative channel on the different antennas, and MIMO transmissions just care about relative channel values. This implies that using intermediate paths to infer downlink channels is not the optimal strategy. Therefore, an end-to-end architecture is proposed to directly focus on the more relevant problem of predicting accurate downlink channels, rather than predicting the underlying paths.

An end-to-end architecture is also advantageous due to two system-level considerations. First, an end-to-end model can be easily trained by using explicit supervision. Training data can be collected from some client devices when a base station is set up. Such supervision for accurate distance, angle, and phase of each path of the signal is almost impossible to obtain (which is why past work trains using simulations and fails to capture real-world effects). Second, with 5G, moving the physical layer processing to the edge or the cloud is a new trend in the industry. An end-to-end model can be easily deployed on the cloud with automated processes for training and fine-tuning.

The architecture is modeled using a generative process, inspired by the physics-level intuition that both uplink and downlink channels are generated by the same process from the underlying physical environment. Specifically, a variant of variational autoencoders (VAE) was selected as the end-to-end architecture. VAE first (a) infers a latent low-dimensional representation of the underlying process of channel generation by observing samples of the uplink channel, and then (b) generates the downlink channels by sampling in this low-dimensional space. Given its data-driven nature, VAE can embed real-world effects in the latent space and therefore capture the generative process more accurately. Experimental results below validate this choice of modeling the generative process and show that this design outperforms past signal processing approaches and learning-based approaches that use discriminative models such as fully connected networks that inherently cannot capture the generative process.

A key criticism of end-to-end machine learning models, when applied to networking solutions, is that they often operate in a black-box manner lacking interpretability and therefore, are impractical in real-world scenarios like cellular networks where network operators may want to peek inside the algorithms when things go wrong. This problem is addressed herein, as FIRE's VAE enables interpretability as it encodes the generative process in a probabilistic latent space representation which is indicative of the physical characteristics of the signal transmission (e.g. client properties, locations, reflectors in the environment) and provides potential insights for network operators.

These embodiments also address several challenges that arise out of hardware imperfections in the real world. Wireless channel measurements at base station and client devices are not just a function of underlying signal paths. Instead, they are also strongly impacted by hardware effects like carrier frequency offset (CFO), packet detection delays, etc. In practice, CFO introduces random phase shifts to the wireless channel that is consistent across antennas and frequencies. On the other hand, packet detection delays add random phase shifts that varies across frequencies. Any machine learning model operating on such raw channel measurements will be confused by these random uncorrelated effects on the wireless signal. It will try to fit to the randomness, instead of the useful information in the wireless channel. Therefore, the embodiments use a data transformation algorithm that can standardize the input-output relationship between uplink and downlink channels.

FIRE is evaluated on a public large scale dataset collected using 96-antenna base stations. It is trained using a single client device and tested on multiple other client devices, and compared against state-of-the-art baselines: a feedback free signal-processing channel inference system, a machine learning based channel prediction model, and a codebook based method. The experimental results show:

Prediction Accuracy: FIRE can accurately predict downlink channels. Channels predicted by FIRE can achieve median MIMO SINR's of 24.9 dB as compared to the best baseline performance of 13.33 dB.

Data Rate: In a Multi-user MIMO setup, over 80% of FIRE's channel predictions can support the highest data rate, as opposed to nearly 10% with the best baseline.

Real-time Operation: The median runtime of FIRE is 3.0 ms (on CPU) compared to 7 seconds (on CPU) for the baseline. FIRE's runtime can support channel estimates within coherence time intervals.

Cross-antenna Prediction: FIRE's architecture can achieve reasonable performance, without optimizations, at other channel prediction tasks such as predicting downlink channels for a subset of base station antennas given uplink channels observations at a different subset (median SNR: 11.95 dB).

Thus, FIRE is the first system to demonstrate high-accuracy MIMO channel measurements in a real-world testbed.

At its core, FIRE leverages data-driven machine learning with powerful variational architectures and enables a new primitive: channel reciprocity without feedback when uplink and downlink transmission happen at different frequencies. While 5G systems are considered herein, it is believed that FIRE is more broadly applicable. The design sits well within the current trend of designing a more agile physical layer that runs in the edge or cloud. Computational tools such as FIRE can be disposed at the core of new radio designs and form the core of future 5G and 6G deployments.

A. Technical Context

Massive MIMO will be a key component in future 5G deployments. Massive MIMO uses tens to hundreds of antennas to simultaneously communicate to multiple client devices and increase the net throughput of the system. Due to this promise, it is estimated that massive MIMO investments for cellular networks crossed ten billion US dollars in 2020.

Wireless channels are a fundamental quantity in wireless systems. For a complex-valued signal x transmitted by a transmitter, the signal received by a receiver is y=hx, where h is the wireless channel (a complex number) and denotes the effect of the environment that the signal travelled through. Specifically, for a signal transmitted at frequency, f:

$$h \propto \sum_i \alpha_i e^{-j\frac{2\pi d_i f}{c}} \tag{1}$$

Where the signal travels along multiple paths, each with attenuation, $\alpha_i$, and distance, $d_i$. The speed of light is c.

In massive MIMO, a base station has multiple antennas (say M) and aims to talk to multiple client devices (say K<M) simultaneously. For simplicity, it is assumed that all client devices have one antenna each. The wireless channel can now be represented as a K×M matrix H, where $h_{km}$ denotes the channel from antenna m to client device k. Assume that x is the M×1 complex vector of signals transmitted from the M antennas. Then, the signal received at the K client devices, y, is given by: y=Hx, where $y_k$ is the signal received at client device k.

Suppose that the base station wants to communicate value $q_k$ to the client device k. It needs to transmit signal x such that $y_k$ received at client device k is just a function of $q_k$ and does not see interference from $q_{k'}$ intended for other client devices. To achieve this effect, the base station pre-codes the values $q_k$. The base station identify a M×K pre-coding matrix P such that x=Pq, where q is the K×1 vector of $q_k$'s. Therefore, the received signal is $$y = HPq \tag{2}$$

One standard way to select the pre-coding matrix P is called zeroforcing, and sets P=H†, where H† is the right pseudo-inverse of H. Therefore, y=HH†q=$I_K$q, where $I_K$ is the K×K identity matrix. This allows every client to receive its own signal without suffering interference from the signal intended for any other client.

Note, the above procedure relies on accurate knowledge of the wireless channel, H, at the base station. Any error in estimating H leads to interference for the client devices and reduces their data rates. Recall, from Eq. 1, the wireless channel depends on the frequency and distance.

Focusing first on TDD systems, where the uplink and downlink happen on the same frequency, Wireless signals travel the same paths on uplink and downlink. Therefore, for a base station-client pair using TDD, the channel for the uplink and the downlink are equal aside from some hard- ware factors that can be accommodated by way of calibration. This principle is called reciprocity. The client transmits some pilot symbols known to the base station so that the base station can estimate the uplink channel, and use reciprocity to infer the downlink channel (which is just a constant multiplication to the uplink channel). In terms of overhead, this process requires just K uplink pilots, one for each transmitting client and is independent of the number of antennas on the base station as base station antennas can simultaneously sense the signal.

For FDD, the uplink and downlink transmission happen on different frequencies. Therefore, the downlink channel is not equal to the uplink channel. For FDD base stations to leverage MIMO, the base station sends M pilot symbols one on each antenna. Each client device measures the downlink wireless channel from each antenna to itself and sends the M channel values as feedback to the base station. In total, K client devices send M×K channel values as feedback. This feedback incurs overhead that scales with the number of antennas and number of client devices (M×K). It has been shown that in TDD, massive MIMO can enable theoretically infinite scaling with increasing number of antennas and client devices. However, this feedback overhead caps the scaling for FDD systems, since it scales up with M and K as well, and the spectrum becomes the bottleneck.

Reference numbers from the relevant literature obtain a conservative estimate of the feedback overhead. Assume a downlink frequency band centered at 2 GHz with a 10 MHz width. A typical coherence bandwidth for a pedestrian in outdoor scenarios is 300 kHz and the coherence time is 50 ms. The coherence time goes down to 2.5 ms for motion at vehicular speeds (e.g. smartphones during travel). The coherence bandwidth and time indicate the frequency-time interval over which the channel doesn't change much. Conservatively, assume that the client device just sends one value for one coherence frequency-coherence time interval. Furthermore, assume a standard setup with 64 base station antennas transmitting to 8 client devices. In such a setup, the feedback overhead is 3 Mbps for the pedestrian scenario and 54 Mbps for the mobile scenario in cars, assuming 8 bits (4 real, 4 imaginary) for each channel value. Given that 10 MHz channels can support between 2 to 70 Mbps depending on channel conditions, this feedback is unsustainable. There- fore, it is believed that FDD systems are not suited for massive MIMO operations or must limit themselves to coarse-grained use of multiple antennas like beamforming, which does not require as accurate channel estimation. The embodiments herein aim to reduce this feedback to zero while supporting accurate downlink channel estimates.

Today, in most parts of the world, FDD remains either the only or the heavily dominant strategy for cellular spectrum allocation. For instance, the leading cellular providers in the United States all use FDD. 5G NR will use a mix of existing and new spectrum. The new spectrum allocations are a mix of TDD and FDD spectrum, with FDD still dominant in the sub-6 Hz band. One might wonder why FDD spectrum is preferred despite the challenges associated with MIMO operations. It is because FDD systems provide better cov- erage for edge client devices, require fewer base stations, and incur lower cost overall.

The uninterrupted operation of clients and base stations also extends range and reduces the need for base stations. According to industry studies, TDD systems need up to 65% more base stations than FDD systems for similar coverage and performance. In contrast, the key disadvantage of FDD systems is the channel estimation overhead and its implica- tion for MIMO operation. Therefore, it is been proposed to use carrier aggregation across FDD and TDD to combine the best aspects of TDD (MIMO) and FDD (larger range, lower overhead, continuous coverage).

B. System Objectives

In these embodiments, the aim is to reduce the burden of channel estimation and feedback for future FDD MIMO systems. These systems are designed with the following goals:

Zero Feedback: The design should not require any feed- back from the client device. In certain cases, some feedback may be useful however.

Accuracy: The channel estimates must be accurate enough to support advanced MIMO techniques.

Interpretability: The system must support interpretability of the end results.

Robustness: The system must be robust to real-world variations like hardware effects, client mobility, etc.

With these objectives in mind, FIRE is presented as an end to end design for downlink channel estimation without feedback. A base station measures the uplink channel (as it would normally do) using uplink pilot symbols. It then feeds the uplink channel estimates to FIRE, which uses them to compute the corresponding downlink channel. The down- link channel can then be used to perform precoding for advanced MIMO techniques.

The system is designed for operation in the traditional frequency bands used for cellular communication (<2 GHz) and for the newly allocated sub-6 bands (<6 GHz). Most 5G deployments in the near term by providers like ATT, T-Mo- bile, Verizon, etc. will rely on sub-6 bands. Millimeter wave bands (>20 GHZ) offer high bandwidth capabilities and use multiple antennas, but the MIMO process and challenges in these bands are different due to high attenuation, largely line-of sight operation, etc. Nonetheless, variations of FIRE may operate in these systems as well.

C. End-to-End Architecture for Channel Prediction

A fundamental question is whether it is possible to infer downlink channels from uplink channels. To understand why this is the case, consider Eq. 1 where the channel value, h, measured at a given antenna depends on the path travelled by each signal from the transmitter to the receiver antenna. Specifically, it is a function of attenuation, $\alpha_i$, and distance, $d_i$. Attenuation $\alpha_i$ denotes the attenuation due to path loss and loss incurred during reflection (including phase changes caused by reflection). So, if the channel measurements at one frequency can be used to infer the distance $d_i$ and complex attenuation $\alpha_i$, these values can be plugged into Eq. 1 to infer wireless channels at a different frequency.

This process is aided by two factors: (a) for a given path, the length of the path travelled by the signal to each base station antenna is not independent, but rather a function of the angle that the signal is received at—this reduces the number of variables to estimate, (b) cellular networks use OFDM (orthogonal frequency division multiplexing) to divide the frequency bands into multiple sub-frequencies. This enables uplink channel measurements at multiple frequencies, giving the base station more measurements to identify the underlying variables. In this context, two observations can be made.

The first is that the low bandwidth of cellular transmissions hinders parameter estimation: Inference of the distance, angle, and attenuation of each path from channel measurements is a challenging task. A small error of even 0.3 radians in channel phase (caused by 0.5 cm distance error at 3 GHz frequency) will cap the SNR (signal to noise ratio) of the channel estimate at roughly 10 dB, which is insufficient to support MIMO transmissions. Low bandwidths of cellular transmissions (10-100 MHz) limit the accuracy of these distance measurements and cause errors in accurate path estimates. In fact, past work achieves an SNR of 5 to 8 dB due to such errors. In practice, MIMO transmissions would need channel accuracy in the range of 15 to 20 dB, which is nearly 10 times more accurate (dB uses the log scale).

The second is that path estimation is not required for MIMO: Note from Eq. 2, MIMO does not need absolute channel values for accurate pre-coding. If the same constant is multiplied to the channel across different antennas, it can be abstracted out and does not impact the pre-coding matrix computation. Therefore, accurately estimating all the parameters of the underlying paths to obtain the precise wireless channel is not needed. For instance, adding the same distance to all paths does not impact the relative channel. Similarly, adding the same phase shift to all reflectors does not impact the relative channel. This implies that channel inference for MIMO does not need to accurately infer all the parameters for each path. Motivated by this insight, the embodiments herein involve shift in paradigm: from inferring intermediate paths to an end-to-end approach that focuses directly on the channel inference problem.

Figure 5:
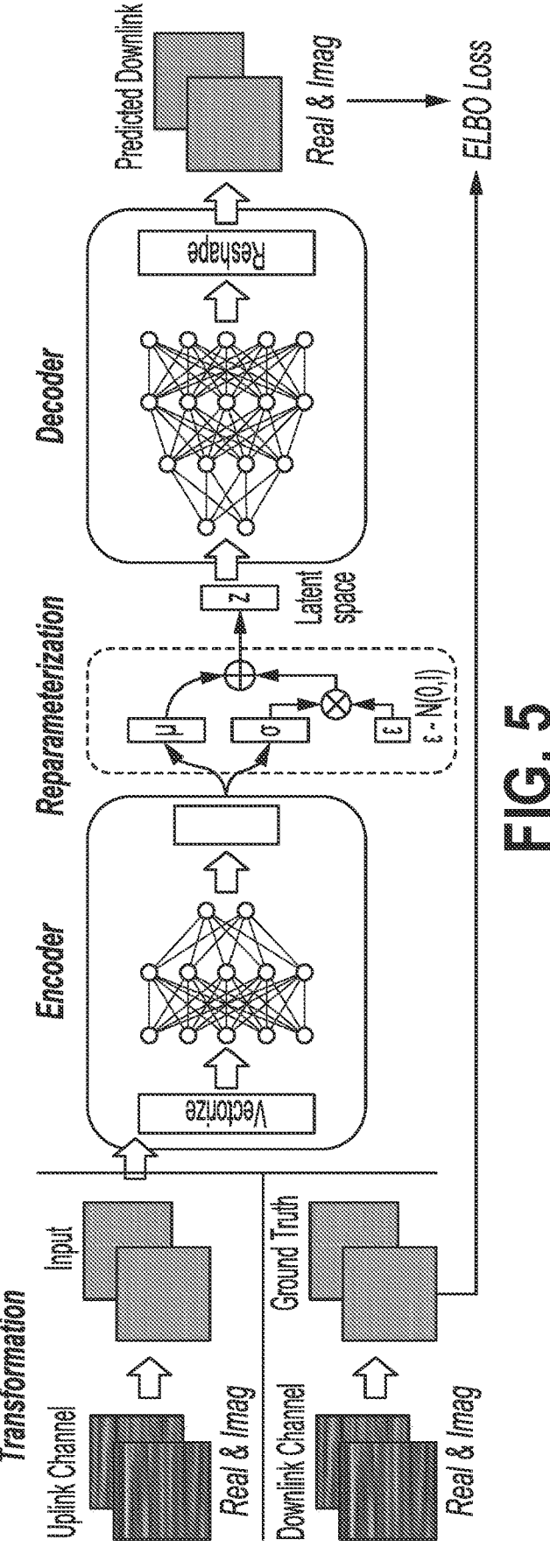
FIG. 5 depicts an encoder-decoder based neural network model, in accordance with example embodiments.

The embodiments herein leverage data-driven machine learning to model the end-to-end problem of downlink channel estimation. FIRE aims to generate downlink wireless channel estimates by observing the uplink channel measured by the base station. The overall architecture of FIRE is shown in FIG. 5.

FIRE first performs a data transformation step on uplink channels to remove hardware errors and then feeds them to a learned predictor based on variational autoencoder (VAE). VAE was chosen for three reasons: First, VAEs learn a latent space representation (like traditional encoder-decoder architectures). This representation has been shown in past work to enable generative modeling to generate new data points from a distribution, and link prediction in graphs. Intuitively, FIRE's task is also a data extrapolation task. Therefore, VAEs are naturally suited for this task. Second, VAEs are more powerful than other architectures like classic autoencoders used for representation learning. Therefore, they enable higher accuracy for channel inference. Third, the latent space representation in a VAE is usually disentangled and is therefore a natural candidate for getting more insights into what the network is learning. This interpretability is not possible with traditional classifiers based on fully-connected or LSTM architectures.

Traditionally, VAE learns the probability distribution of the training dataset x by first encoding x into a lower dimensional latent space z via an encoder network. The encoder learns the distribution of z maximizing p(z|x). Next, samples are drawn from this distribution and a decoder network decodes the samples to generate new data from the distribution of x. Unlike traditional VAEs, outputs and inputs here are not the same. However, based on the hypothesis for the end-to-end approach described above, the downlink channel can be obtained from the uplink channel. Therefore, the VAE learns the distribution of the downlink channel given the uplink channel (instead of learning the distribution of the uplink channel as would be the case in traditional VAEs). In FIRE, the encoder network is used to learn a lower-dimensional interpretable representation $Z = \mathbb{R}^l$ for the target distribution. The decoder then uses the obtained representation to predict the downlink channel.

Let $$\{u^i\}_{i=1}^N$$

and $$\{d^i\}_{i=1}^N$$

be the uplink and downlink channel values consisting of N datapoints from the training set. Then, $u^i \in U = \mathbb{R}^{2 \times N_a \times N_b}$ and $d^i \in D = \mathbb{R}^{2 \times N_a \times N_b}$ where $N_a$ and $N_b$ are the number of antennas and the number of OFDMA subcarrier frequencies. The value 2 corresponds to the real and imaginary parts of the complex values channel. To avoid clutter, the following shorthand is used: du=d|u (d given u). The training objective in this context is to maximize the log-likelihood of the predicted downlink channel:

$$\sum_{i=1}^N \log p(du^i) \tag{3}$$

However, computing log p($du^i$) exactly is an intractable problem and therefore it is approximated by the evidence lower bound (ELBO):

$$ELBO = \mathbb{E}_{z \sim q(z|du^i)} \log p(du^i \mid z) - D_{KL}(q(z \mid du^i) \| p(z)) \tag{4}$$

Where the first term is the reconstruction loss and the second term corresponds to the KL divergence between the latent space distribution given the observations q(z|du$^i$) and the multivariate standard normal distribution (z) with mean 0 and variance 1 in the latent space. The term q(z|du$^i$) is also a multivariate Gaussian distribution, however, its mean and variance are unknown apriori and learned during training. Minimizing the KL divergence between q(z|du$^i$) and the standard normal distribution provides two properties.

The first property is continuity, in that the decoded downlink channels corresponding to samples close to each other in the latent space should not be too different. The second property is completeness, in that any point sampled from the latent space corresponds to a valid downlink channel.

For the encoder network, the transformed channel estimation matrix with the dimensions of $2 \times N_a \times N_b$ is flattened into a vector, then fed it into a three layer fully connected (FC) neural network with LeakyReLU as the activation for the first two layers and no activation for the third layer. Note that a different number of layers and a different activation function can be used. The output of the FC network yields the mean vector $\mu$ and the variance vector $\sigma$, as shown in FIG. 5. During training, the encoder network maximizes the likelihood of the latent distribution $q(z|du^i)$ generating $d^i$ given $u^i$.

The decoder neural network takes as input a sample from the latent space and predicts the downlink channel value. To enable a strong prediction ability, four layers of a fully connected network (one more layer than the encoder network) are used. The first three layers have LeakyReLU activation while the last one has Tanh activation. Note that a different number of layers and different activation functions can be used. The output vector is reshaped back to size $2 \times N_a \times N_b$ to get the downlink channel matrix. During training, the decoder network samples z from $q(z|du^i)$ and learns the parameters maximizing $p(du^i|z)$.

The loss function in Eq. 4 consists of the reconstruction loss and the KL divergence. The reconstruction loss is defined as the Mean Square Error (MSE) loss, $MSE(H_{pre}, H_{gt})$, where $H_{pre}$ is the predicted downlink channel and $H_{gt}$ is the ground truth downlink channel after the data transformation. The raw downlink channel values are not used as the ground truth, since they contain signal distortion and the relative values of the channel matrix are what is important in MIMO technologies. The KL divergence is computed in closed form as:

$$L_{KL} = \frac{1}{2}\sum_{j=1}^{l}\left(\mu_j^2(u^i) + \sigma_j^2(u^i) - \log\sigma_j^2(u^i) - 1\right)$$

Thus, the overall ELBO loss equation can be written as:

$$ELBO = MSE(H_{pre}, H_{gt}) - \beta L_{KL}$$

Where $\beta$ is a hyperparameter that balances the contributions of the reconstruction loss and the KL divergence loss during training.

D. Interpretability

Channel values are complex numbers and as such, are hard to manage. Consider the real and imaginary matrices shown in FIG. 5, for example. A network operator cannot gain much insight out of these channel values. Therefore, interpretability is a challenge for an end-to-end design that ingests uplink channel matrices and outputs downlink channel matrices. FIRE's VAE design presents an improvement over this scenario. Specifically, the VAE learns a latent representation that disentangles the uplink channel values into physically relevant information.

To highlight this point, a simple experiment is provided. The uplink and downlink channel matrices collected from six client devices placed at six different locations in a non-line-of-sight setting. The client devices are physically separated from each other and experience distinct physical paths. First, the uplink channel measurements from these client devices are considered. To visualize the channel matrices across time from these client devices, the Uniform Manifold Approximation and Projection (UMAP) method is used. UMAP provides non-linear dimensionality reduction and embeds the channel matrix into a 2D space. The uplink channel for different measurements are plotted in part (a) of FIG. 6. As shown, client devices are scattered across the 2-D space in no apparent pattern, showing intense entanglement between the uplink channels from the different client devices.

Figure 6:
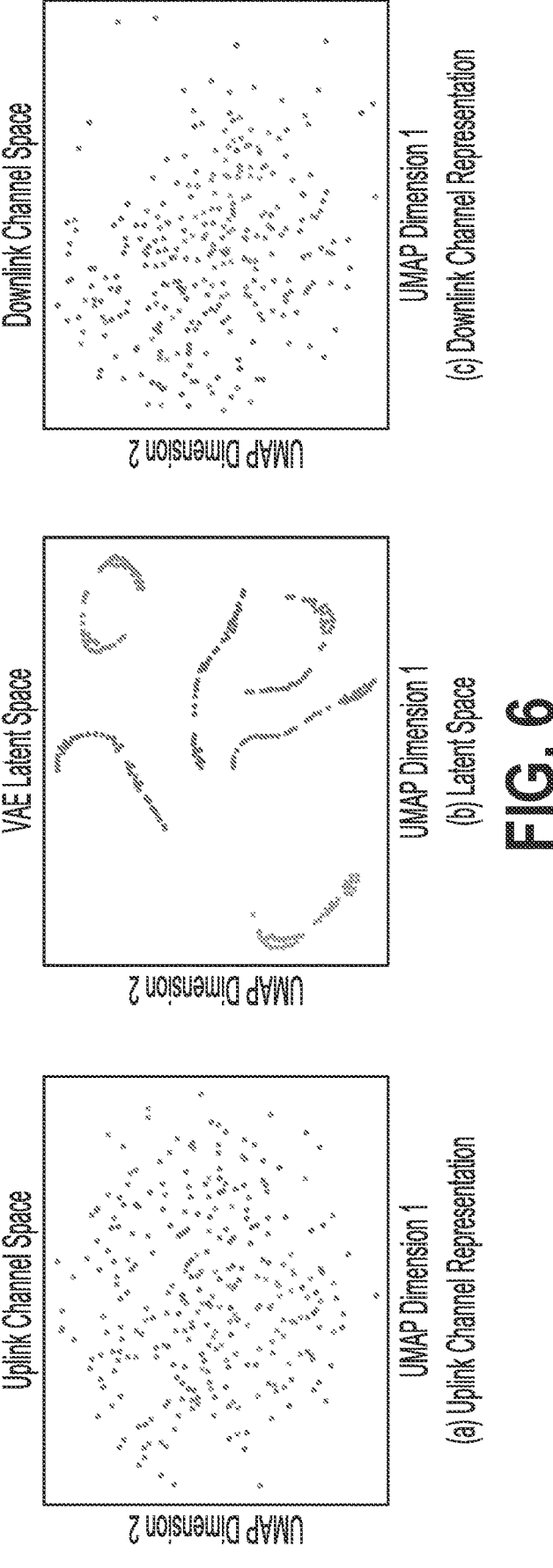
FIG. 6 depicts channel spaces and a latent space, in accordance with example embodiments.

Next, the same analysis is performed on the latent space learned by the VAE, the 2-D representation of these vectors is plotted in part (b) for FIG. 6. In the figure, the client devices at different locations form different clusters indicating that the different locations get mapped to different points in the latent space. In addition, it is worth noting that some client devices are geographically closer to each other in the real world than other client devices. This is also indicated by proximity in the latent space representation. Moreover, each location does not map to the same point. This is because the channel changes due to reasons other than the location change like environment mobility, hardware variations over time, etc. Overall, the latent space representation provides a way for an operator to identify the most relevant factors determining the downlink channel. This insight can be leveraged by the operator to debug the system, e.g., whether a particular location or device is prone to receiving bad signals.

While the encoder network shows the above ability to disentangle features, the decoder network maps the latent space back into the downlink channel values as shown in part (c) of FIG. 6. This mapping shows that features become entangled again and the result resembles the pattern of the uplink channels.

E. Countering Hardware Offsets

When estimating the uplink channels at the base station, client devices send preamble symbols aimed specifically for channel estimation and packet detection. However, the channel estimated in this manner usually contains signal distortion caused by the carrier frequency offset (CFO) and the hardware detection delay. These offsets introduce random distortions to the channel values. If a neural network is trained with these distortions, it will try to fit to the randomness and incur large errors. On the other hand, these random distortions are impossible to remove. To solve this challenge, a data transformation scheme that standardizes the effect of these distortions on the wireless channel and reduces their effect on the neural network is introduced. The data transformation scheme converts the raw channel values into a channel representation that is invariant to these effects. The core insight is that MIMO techniques care about relative channel across different antennas and sub-frequencies, not the absolute channel values. Based on this insight, the algorithm performs three steps defined below.

The first is signal strength scaling. The measured channel matrix could have significant differences in absolute values due to different distances of client devices, environmental changes, user mobility, etc. However, MIMO systems typically do not care much about the absolute scaling of the channel matrix but only the relative scaling. Therefore the channel matrix H is normalized as $$H_{norm} = \frac{\sqrt{N}}{\|H\|}H,$$

where N is the number of antennas at the base station, and $\|H\|$ is the second order Frobenius norm (i.e., the Euclidean norm) of H.

In realistic hardware settings, CFO is usually caused by frequency misalignment in oscillators between the base station and the client devices. This frequency offset, denoted by $\Delta f$ will continuously add a phase shift in the received signal $\hat{x}(t)$ with respect to the true signal $x(t)$ over time, where $\hat{x}(t) = x(t)e^{j2\pi\Delta ft}$. In MIMO-OFDM systems, the antennas are often co-located as an antenna array. Hence, it is valid to assume that only one oscillator is referenced at either the transmitter side or the receiver side. As a result, a single CFO-induced phase value is added to channel measurements across the whole antenna array at the base station. The phase rotation can be eliminated by dividing the channel matrix by the value at the first antenna measured at the same time. Note that key MIMO techniques only care about the relative channel values among antennas and this kind of division does not affect the relationship in antenna array.

There is a delay $\Delta t$ between the time when the signal reaches the RF frontend and the time when the signal is actually detected by the decoding algorithm. This delay will add a further phase rotation $2\pi f_i \Delta t$ at every subcarrier i. Because the frequencies of the subcarriers increase linearly with respect to the subcarrier index, this delay basically adds a slope in phase at every measurement. This delay is standardized by zeroing out the slope of the phase across subcarriers for the first antenna. Specifically, linear regression is used to identify the slope of the phase across subcarriers (say m) for channel measurements on the first antenna. Then, the value $mf_i$ is subtracted from the phase of the ith subcarrier on each antenna. Note that this procedure does not remove the random detection delay—in fact, it is impossible to remove. However, it standardizes the representation across different measurements. Different measurements of the same channel will now appear identical to the neural network.

The above three transformations are applied to the channel to obtain a standardized channel matrix that is suitable for neural network training. This results in a channel matrix of size [N, B], where N is the antenna number at the base station and B is the subcarrier numbers in OFDM. However, this still cannot be used for neural network inference, which only accepts real values as input. To solve this problem, the complex valued channel matrix is considered as a real valued matrix with two "virtual" channels. The real part of physical channel into the first virtual channel and the imaginary part of the physical channel is put into the second virtual channel. Absolute values and phases may be omitted or otherwise not used to avoid phase wrapping. The channel matrix is further divided after the aforementioned three transformations by the maximum absolute value in the matrix, and then scaled so that all values lie in the interval [−1, 1], to facilitate training.

F. Experimental Implementation

To satisfy the need of massive MIMO in real-world deployments, the training dataset should have the following characteristics:

Real-world: The dataset should be collected in the real world instead of simulation to model all real-world effects— multipath reflections, hardware effects, noise, etc.

Antenna number at base stations: Massive MIMO is among the most critical technologies in next-generation networks, and has the potential to boost the throughput by increasing the number of antennas at the base station. However, building a base station with tens to a hundred antennas from scratch faces several technical issues and needs sophisticated hardware expertise.

User mobility: The trained neural network, once deployed, could be used not only in the static environment, but also in cases when users served by the base station are moving, making the dataset consistent with real-world application demands.

There are several open-access platforms that provide programmable interfaces to conduct the Channel State Information (CSI) collection. However, they at least miss one of the above needs. Based on the above concerns, Argos Channel dataset was selected as the training dataset. The Argos dataset contains real-world channel state information in diverse environments with up to 104 antennas at the base station serving 8 users. Varieties of user mobility patterns are recorded in the traces in both line-of-sight (LOS) and non-line-of-sight (NLOS) settings. The dataset contains some static locations as well, but since the cellular networks mostly cater to mobile users, the mobility use case is the focus of his evaluation.

The raw traces contain the received 802.11 Long Training Symbols (LTS), the CSI value could be extracted from them by doing the channel estimation. The trace durations in the dataset range from tens of seconds to 20 minutes with different channel sounding interval. These traces are collected using omnidirectional monopole antennas spaced 63.5 mm apart, which is half a wavelength at 2.4 GHz and one wavelength at 5 GHz. Bandwidth is 20 MHz with 64 OFDM subcarriers in the symbol. The first half of the frequency band is treated as the uplink and the goal is to predict the second half using the neural network. Each data point is a matrix with size of [2, antenna number, subcarriers]. Unless otherwise specified, the uplink and downlink channels consist of 26 subcarriers each after removing the guard bands.

A four-antenna base station was implemented using the Skylarkwireless Iris-030 software radio platform. Two Iris-030 devices with broadband analog front-ends were used, connected in a daisy-chained manner so that they can be synchronized. Another Iris device was used as a two-antenna user device. The software radios operated in 2.4 GHz ISM band with a bandwidth of 10 MHz. These devices operated in an FDD manner, i.e. the uplink and downlink operate on different frequency bands. The uplink and downlink are separated by 20 MHz. Since the Iris device allows setting the transmit and receive frequencies independently, switching frequencies to enable FDD operation is not needed.

The base station was fixed and the user end was moved to 50 different locations in an indoor space to collect the channel measurements. During the channel measurement, two Long Training Sequences (LTS) were sent for channel estimation along with five OFDM data symbols. The estimated channel was used for decoding the data symbols to verify that the channel estimation is sound. This dataset enables a rich diversity in our channel measurements. Ten locations were randomly selected as the test dataset. Since two devices were used to implement the base station, hardware resets and clock resets add random phase offsets and timing delays to the channel estimates. To avoid this error, whenever a reset is performed (for example, to prevent overheating) two measurements are taken: one before the reset and one after the reset at the same static location. These two measurements are used remove the random phase offsets and timing delays in software.

Since hardware implementation is limited to a four antenna base station, the Argos dataset described above was used as the default evaluation method. Nonetheless, this hardware implementation demonstrated FIRE's robustness to different environments, frequency bands, and measurement devices.

A network structure search was carried out in terms of depth and it was found that when the network gets deeper, the prediction accuracy increases. But the accuracy won't increase too much after the network is deeper than 4 layers for both encoder and decoder. For the encoder network, the hidden layer sizes were 64, 64, and 100 for the three layers. This leads to a latent space with dimension 50 (50 values each for the means and the variances). For the decoder network, it was experimentally found that a deeper network would give a better reconstruction performance. Thus, a four-layer FC network is used with hidden sizes of 50, 64, 64, and $2 \times N_a \times N_b$.

The neural network was implemented using PyTorch with training parameters including a batch size of 512, learning rate of $10^{-4}$, and $\beta$ of 0.1. The Adam optimizer was used for adaptive learning rate optimization. These hyperparameters were fixed during the experiments. While some tuning is useful, it was found that FIRE could perform well under a wide range of hyperparameter values. The model was obtained after 200 epochs training and the memory footprint of the model is 0.5 MB.

The total number of points in the dataset is 100K (80K for the training and 20K for the testing). To ensure separation in data points and ensure device independence, the training set and test set are collected using different client devices. Training used on one client device and testing on data from seven other client device. In this fashion, it can be established that once FIRE is fully trained, it can generalize to unseen users under varieties of scenes. The test set contains data from multiple environments: line of sight, non-line of sight, indoors, outdoors, etc. Finally, all of the training and test data is collected in mobile scenarios, where the client is in motion.

Notably, these specific parameters were chosen for purposes of the experiments. Various other combinations of parameters could be used without departing from these embodiments.

G. Experimental Results

FIRE is compared against the following baselines:

R2F2: R2F2 predicts the downlink channel at frequency band F2 by observing the uplink channel at frequency band F1. Given uplink channel values, it solves an optimization problem to identify the number of paths and the corresponding path parameters—angle of arrival travel distance, attenuation, and reflections. It uses these parameters to estimate the downlink channel.

OptML: OptML takes an approach similar to R2F2, but uses a neural network to predict the underlying path information from uplink channels. By leveraging this information, it accomplishes the cross-band prediction in an antenna array by further using a multi-antenna optimization algorithm.

FNN: There is another line of work that uses fully connected neural network for cross-frequency channel estimation directly. This line of work has been evaluated with simulated data and, therefore, cannot deal with real world issues like hardware effects. Therefore, the channel prediction does not work on real-world datasets. For fair comparison, these methods with are augmented FIRE's data transformation algorithm before using the neural network. It is implement via a five-layer fully connected network and its performance is tuned with its best hyperparameters.

Codebook: Both base station and client devices maintain a codebook, which consists of large number of vectors established by predefined rules. Client devices measure the channel locally and choose the closest vectors in the codebook, then send the index back to the base station. Note that codebook method differs from above three baselines, for it does not eliminate the channel feedback but reduces it. An 8-bit random codebook was used, i.e., the quantization vectors are drawn from a complex Gaussian distribution. This is also the method used by many standard implementations, as recommended by the 3GPP physical channel standard.

Figure 7:
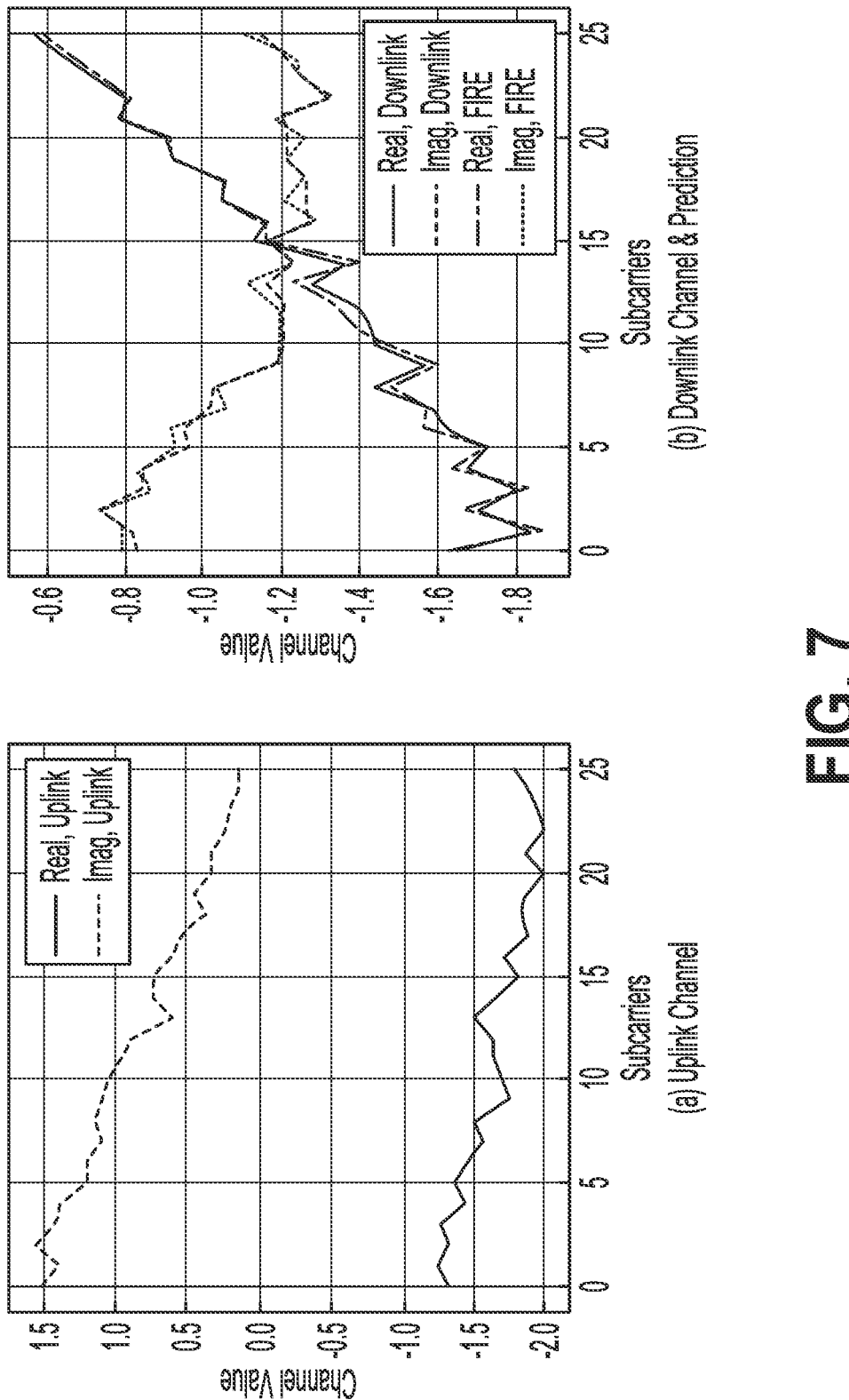
FIG. 7 depicts channel and signal-to-noise ratio predictions, in accordance with example embodiments
Figure 7:
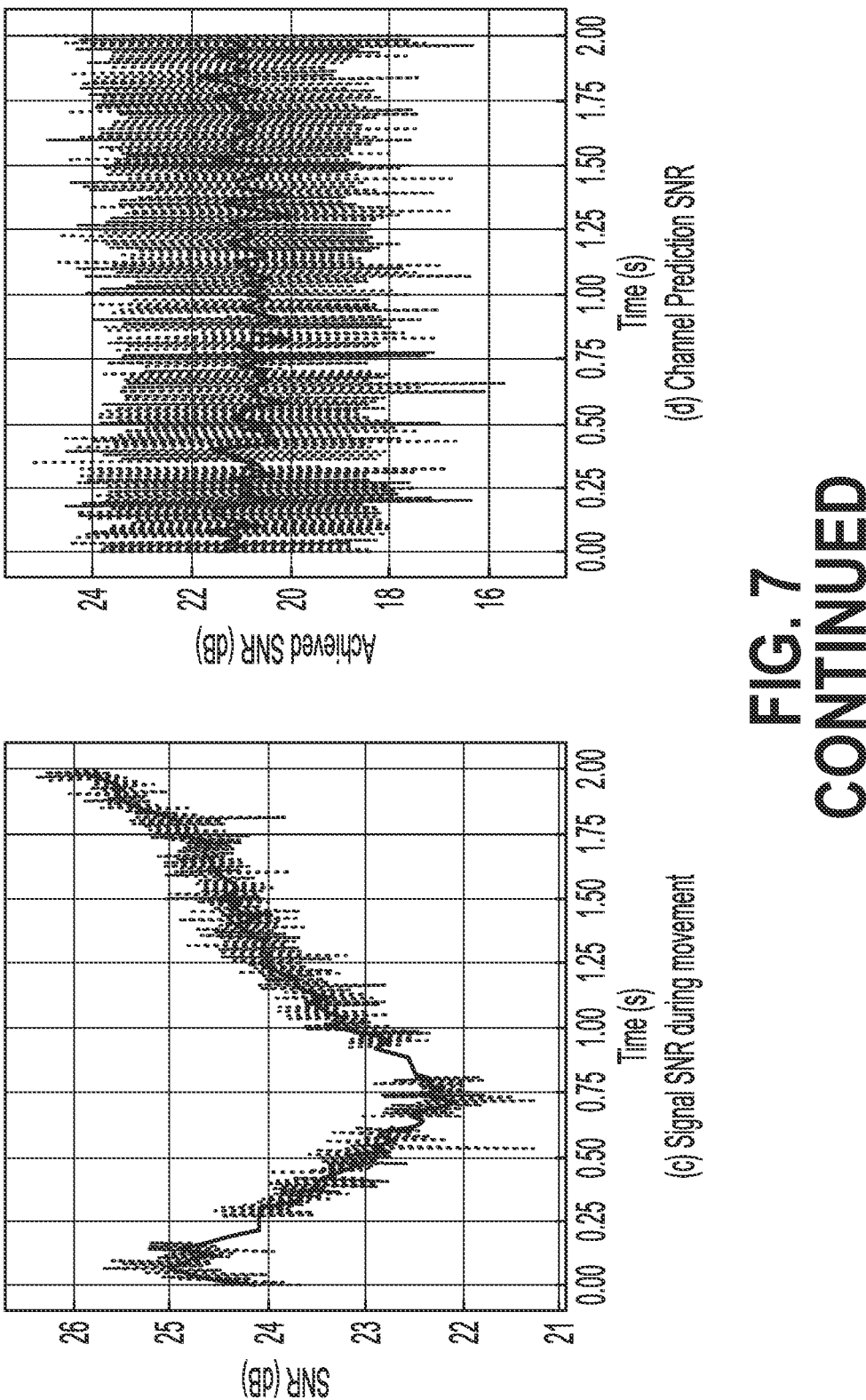

Microbenchmarks can provide insights about the operation of the embodiments here. FIRE was trained on the Argos dataset with an 8-antenna base station and a client at different locations. FIG. 7 plots the results from a representative run. Given the uplink channel value measured at 8 antennas FIRE predicts the downlink channel value from the same 8 antennas to the client. Part (a) of FIG. 7 plots the real and imaginary parts for the uplink channel on a single antenna, and part (b) of FIG. 7 plots the predicted downlink channel (along with the ground truth). Note that the uplink and downlink channels look different compared to each other. Yet, FIRE can accurately predict the downlink channel. FIRE was also tested on an unseen dataset where a different client device moves back and forth with respect to the base station. The signal SNR is plotted in part (c) of FIG. 7, where the main line is the average value measured every 20 ms. This shows that the SNR decreases when the client moves away from the base station and vice versa. FIRE predicts the downlink channels for each data point during motion. The SNR of the predicted channel is calculated by comparing the predicted channel H and the ground truth channel using $H_{gt}$ using:

$$SNR = -10\log_{10}\left(\frac{\|H - H_{gt}\|^2}{\|H_{gt}\|^2}\right) \qquad (7)$$

As shown in part (d) of FIG. 7, the SNR of the predicted channel is consistently very high (conversely the error in predicted channel is very low), for a mobile client in continuous motion. The SNR of the predicted channel is compared across a larger dataset with several baselines below.

Figure 8:
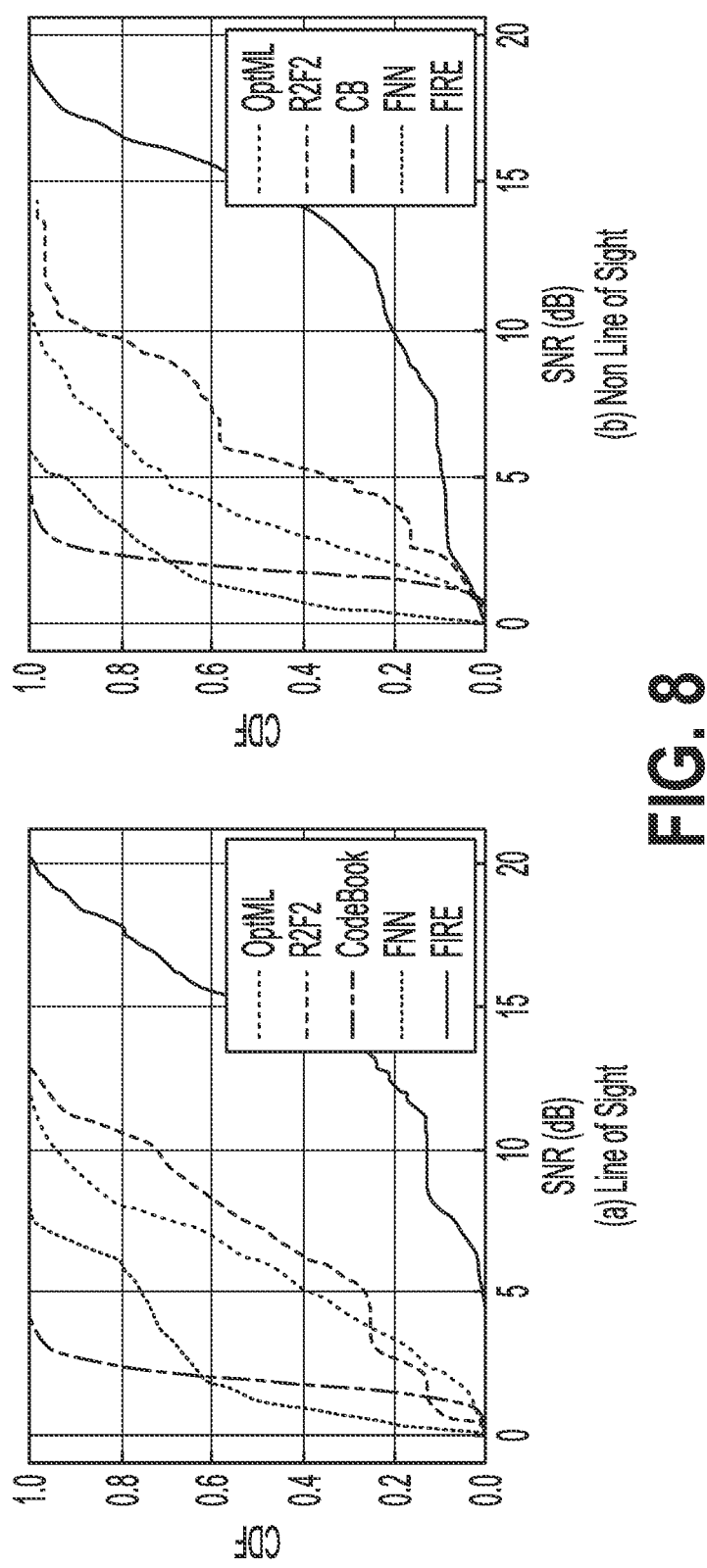
FIG. 8 depicts operation in line of sight (LOS) and non line of sight (NLOS) environments, in accordance with example embodiments.

Channel quality (SNR) is evaluated and compared using Eq. 7, under both LOS and NLOS settings. The results are plotted in FIG. 8. Since the NLOS environment does not have a direct path and is saturated with complicated multipath effects, it increases the level of difficulty for optimization-based algorithms (e.g., R2F2 and OptML) to find the correct multipath parameters by simply looking into the uplink channel measurement. However, FIRE maintains a high accuracy in both LOS and NLOS settings because of its end-to-end prediction methodology and the specialized data transformations.

Specifically, FIRE achieves a median accuracy of 14.87 dB (10th percentile: 7.89 dB, 90th percentile: 18.5 dB) in LOS and 14.81 dB (10th percentile: 5.77 dB, 90th percentile: 17.29 dB) in NLOS settings. In comparison, the next best baseline is R2F2, which achieves median SNR of 7.29 dB in LOS and 5.73 dB in NLOS settings. Note that FIRE's $10^{th}$ percentile SNR outperforms R2F2's median SNR. Overall, FIRE's SNR is 7.64 dB better than R2F2, 8.61 dB better than OptML, 12.56 dB better than codebook and 11.98 dB better than FNN in LOS environment. For the NLOS environment, FIRE's accuracy is also much higher compared to baselines, and the SNR is 6.96 dB higher than R2F2, 9.16 dB over OptML, 11.32 dB over Codebook and 11.57 dB over FNN. Note, SNR is measured on log scale (10 dB corresponds to 10× gain).

Note that the Codebook method maintains a stable performance in both environments. This is because it quantifies the channel value using the codebook (instead of trying to estimate paths) available both in the base station and user end. Finally, FIRE's VAE design allows a latent representation that is continuous and complete, which is not ensured by FNN. Hence, the design is more suited to the extrapolation task and outperforms FNN by over 10 dB.

Next, how the channel accuracy gains translate into massive MIMO performance gains is analyzed. First beamforming gains are addressed. In beamforming, a base station uses multiple antennas to steer a signal to a specific client. This is particularly useful for low SNR client devices to gain additional signal strength. Typically, past work like R2F2 and OptML do well on beamforming, as the channel accuracy requirement for beamforming is low. For example, a 2-antenna setup achieves an optimal beamforming gain of 3 dB with perfect channel information. With a channel SNR of 10 dB, the gain reduces to 2.6 dB—a small sacrifice.

To compute the beamforming gain, a maximal ratio combining is used. The ideal gain of using multiple antennas is given by $$\frac{|h_g * h_p|}{M|h_{g0}|},$$

where $h_g$ is an M×1 vector of the ground truth channel values, $h_{g0}$ is the channel using a single antenna, $h_p$ is a vector of predicted channel values, and M is the number of antennas. The * operator represents the conjugate vector operation.

Figure 9A:
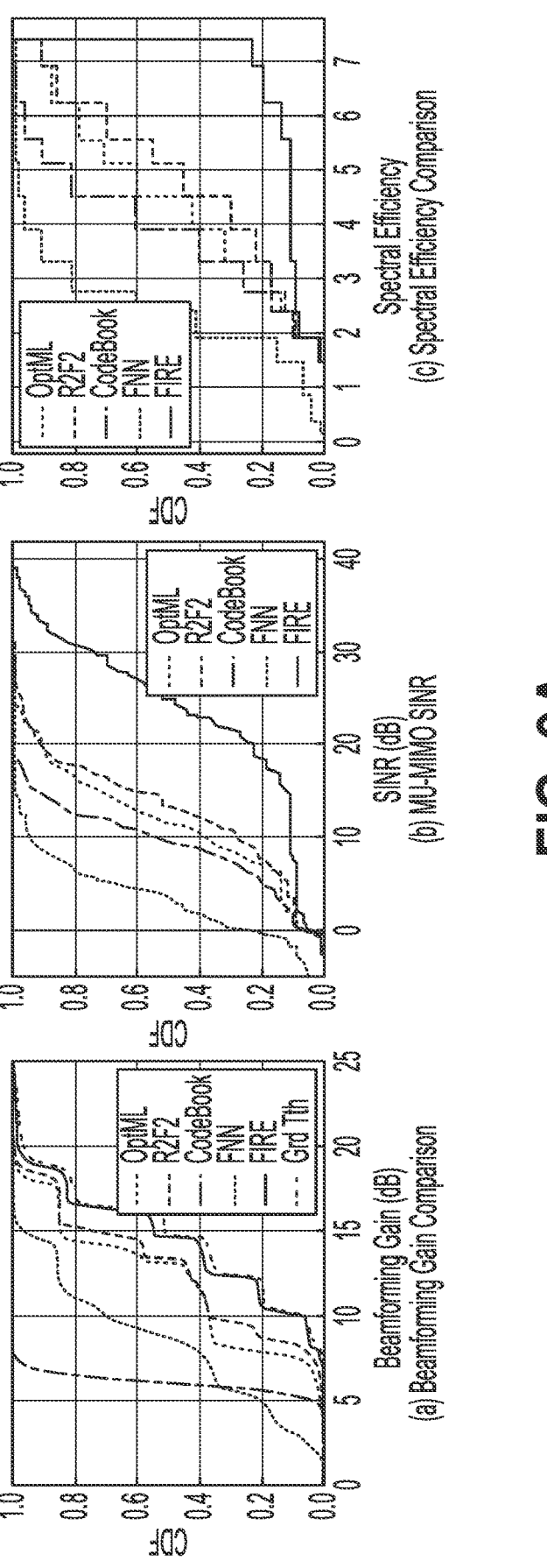
FIG. 9A depicts performance of the techniques described herein, in accordance with example embodiments.

The beamforming gain using an 8-antenna base station is plotted for different baselines part (a) of FIG. 9A. First, note that the gains are very close to beamforming gains achieved with perfect channel estimates (ground truth). There is just a 0.37 dB loss compared to perfect channel measurements. Second, FIRE outperforms other baselines: the median gain is 8.59, 1.51, 1.23, and 5.94 dB higher than codebook, OptML, R2F2, and FNN respectively. This shows that FIRE can successfully enable accurate beamforming in massive MIMO systems.

A more complex multi-antenna technique is multi-user MIMO (MU-MIMO). In MU-MIMO, a base station uses its multiple antennas to transmit to multiple client devices simultaneously. MU-MIMO is preferred in high SNR scenarios where additional SNR to a single client device does not provide any benefit in data rate. Therefore, it is advisable to transmit to multiple devices simultaneously. MU-MIMO has a very high bar for channel accuracy, because any error in channel accuracy means the signal intended for one client will leak into signal intended for another client causing interference. The metric of interest in this case is SINR (signal to interference and noise ratio). As a ballpark estimate, with 2 base station antennas transmitting to two client devices and 8-bit perfect channel measurements, MU-MIMO can achieve theoretical SINRs up to 24 dB. However, a channel SNR of 10 dB will cap the SINR at 10 dB on average. Compared to beamforming, MU-MIMO performance is hurt more by errors in channel estimates.

To evaluate MU-MIMO performance, 2 client devices are randomly sampled to transmit data to and from an 8 antenna base station. This experiment repeats 300 times and the resulting SINR is reported. For MU-MIMO, the zeroforcing method is used to transmit to multiple antennas simultaneously. The client devices are sampled across both LOS and NLOS settings. The results of this experiment are plotted in part (b) of FIG. 9A.

First, note that FIRE achieves a median SINR of 24.90 dB (10th percentile: 8.01 dB, 90th percentile: 33.09 dB). It has been shown that SINRs above 20 dB can support the highest data rate. In more than 80% of the experiments herein, FIRE can support the highest data rate for two client devices simultaneously. This is rare for other baselines—the best other baseline, R2F2, achieves this outcome in nearly 10% of the experiments. To complete the comparison, the median SINRs for R2F2, OptML, FNN, and Codebook are: 13.33 dB, 11.53 dB, 3.41 dB, and 9.52 dB respectively.

It is also noted that this performance of FIRE is comparable to explicit 8-bit channel feedback (24 dB SINR) received per antenna per device. As discussed above, this feedback is unsustainable for client devices today due to the spectrum overhead of transmitting this channel.

Next, these results are converted into spectral efficiency (bits per second per Hz) that shows how much data can be transmitted using FIRE. SINR measurements are converted into channel quality index used in 5G standards and then used to identify the right modulation and coding scheme using the 5G NR standard. This gives the spectral efficiency achieved using different SINR values. The spectral efficiency is plotted in part (c) of FIG. 9A. As shown in the figure, FIRE again outperforms the baseline methods significantly. The average spectral efficiency for FIRE is 6.69 bps/Hz, as compared to 4.89 bps/Hz for R2F2—an improvement of 1.36 times.

For massive MIMO scaling, a question is how does FIRE's performance scale as the number of base station antennas increase. This evaluation still uses the MU-MIMO application. Note that more antennas on the base station can support (a) higher beamforming gains with narrower beams, (b) multiple client devices, and (c) resilience to low channel quality from a subset of antennas. In part (a) of FIG. 9B, the SINR in the MU-MIMO case from the previous section is compared as the number of base station antennas scale up. As expected, increasing the number of antennas from 8 to 64 increases the SINR from 20.71 dB to 28.92 dB for FIRE. This is expected because increasing the number of antennas allows the base station to cancel interference better and to focus its narrower beams on the intended client. However, the baselines cannot fully leverage this because of the errors in their channel predictions and are limited to the best value of 16.20 dB at 64 antennas.

Figure 9B:
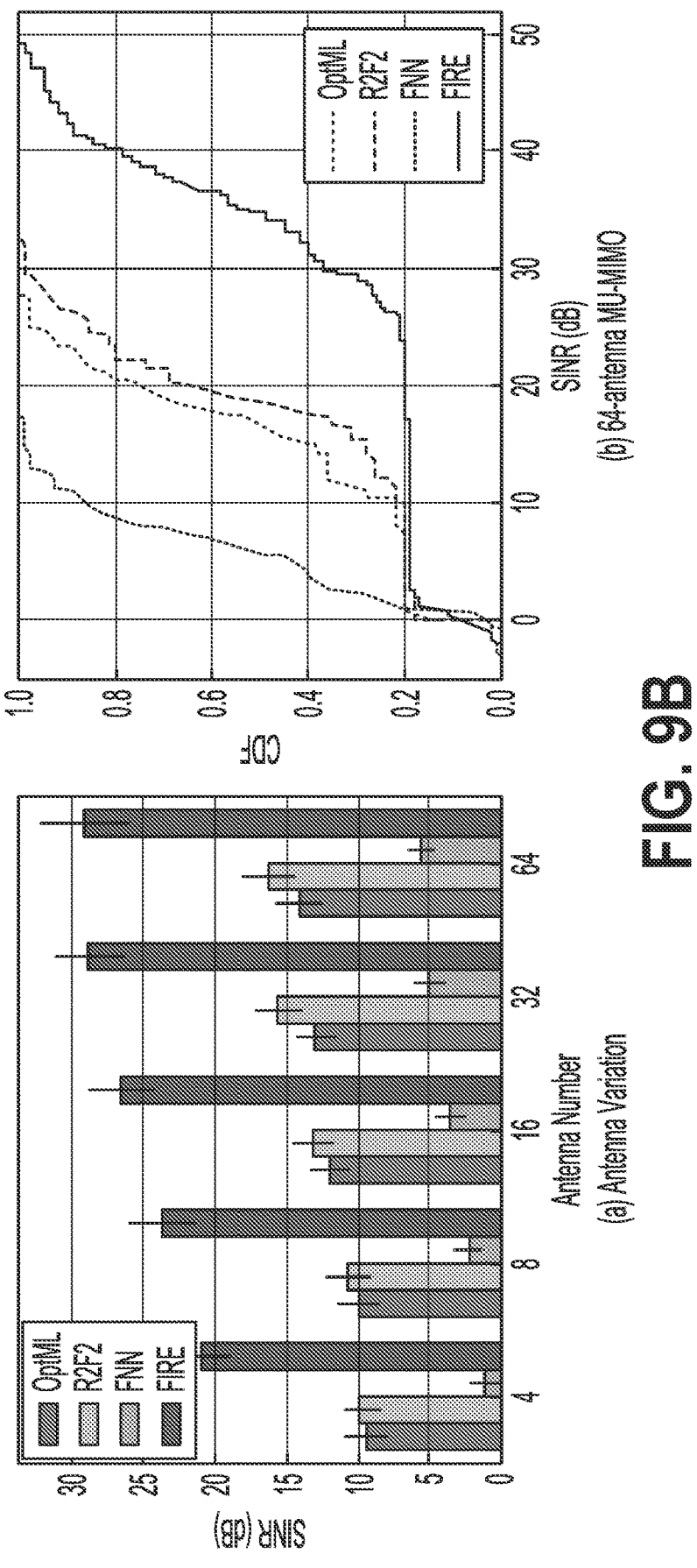
FIG. 9B depicts further performance of the techniques described herein, in accordance with example embodiments.

Part (b) of FIG. 9B plots the 64-antenna MU-MIMO result, showing that FIRE reaches the average SINR of 29.11 dB which is 15 dB, 13 dB and 23 dB better than OptML, R2F2 and FNN respectively. This result demonstrates that FIRE can support base stations with large number of antennas.

Figure 9C:
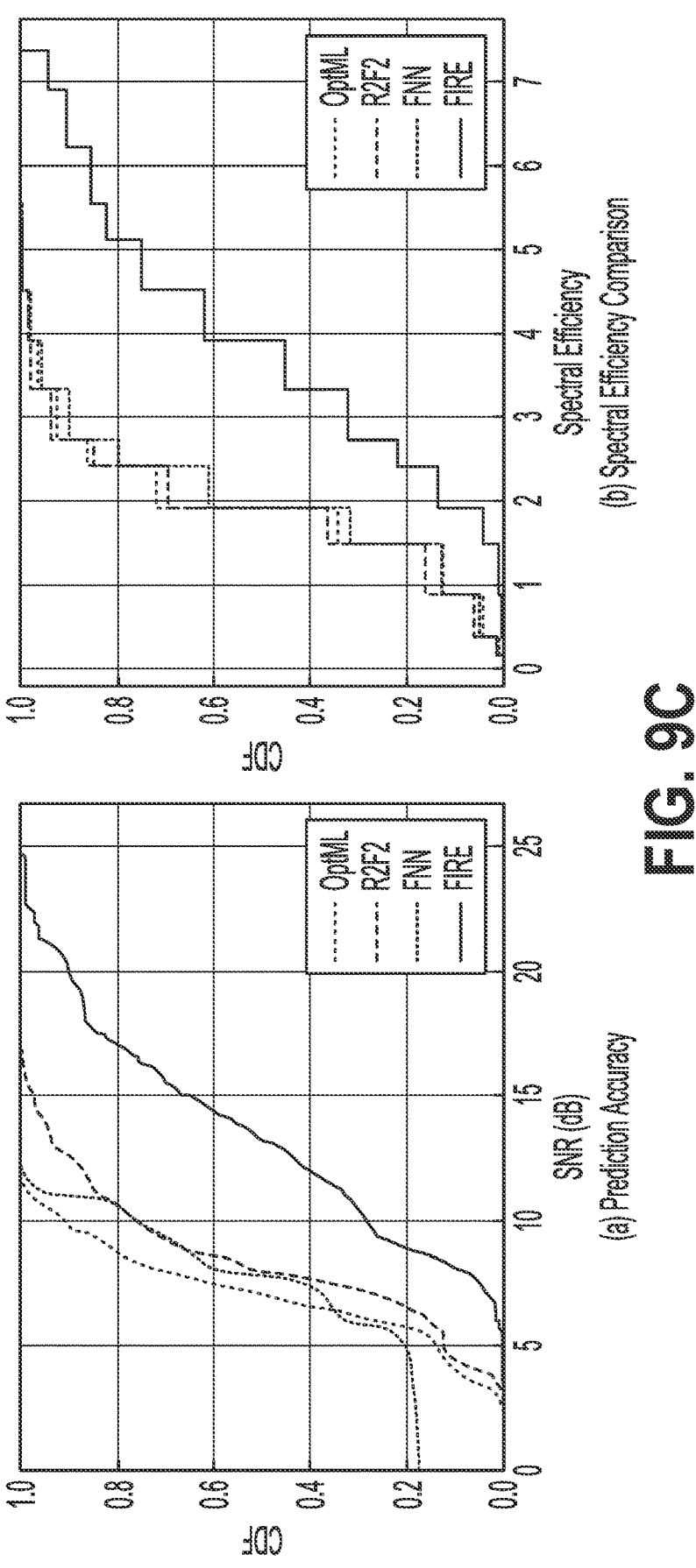
FIG. 9C depicts further performance of the techniques described herein, in accordance with example embodiments.

FIRE was trained and tested on the dataset collected on the hardware platform for further performance validation. The objective of this analysis was twofold: (a) to demonstrate that the performance of FIRE translates to different hardware architectures, and (b) to ensure that the reciprocity assumption in the evaluation using Argos holds true. Part (a) of FIG. 9C shows the prediction accuracy comparison against other feedback-free methods. FIRE achieves a median channel SNR of 13.19 dB (10th percentile: 8.13 dB, 90th percentile: 19.72 dB), which is 5.21, 6.13, and 5.37 dB higher than R2F2, OptML, and FNN respectively. Note that the performance of FIRE on the hardware is similar to the performance on the ARGOS dataset shown in FIG. 8. There is a slight decrease in median SNR (from 14.87 dB to 13.19 dB) due to the decreased number of antennas from eight to four. Smaller antenna number reduces the ability to resolve between different physical paths and hence reduces channel prediction accuracy for all schemes. This result validates FIRE's performance for a bidirectional FDD dataset collected on our hardware platform.

Spectral efficiency was also computed in a 4×2 MU-MIMO transmission, and shown in part (b) of FIG. 9C. As before, two random client locations were selected from our dataset. As expected, FIRE significantly outperforms the other baselines. The average spectral efficiency for FIRE is 3.92 bits per second per Hz. This is 2.09 times better than R2-F2, 2.03 times better than Opt-ML, and 1.93 times better than FNN methods. This shows that FIRE can enable successful MU-MIMO operation in FDD systems.

V. Runtime Analysis

Figure 10:
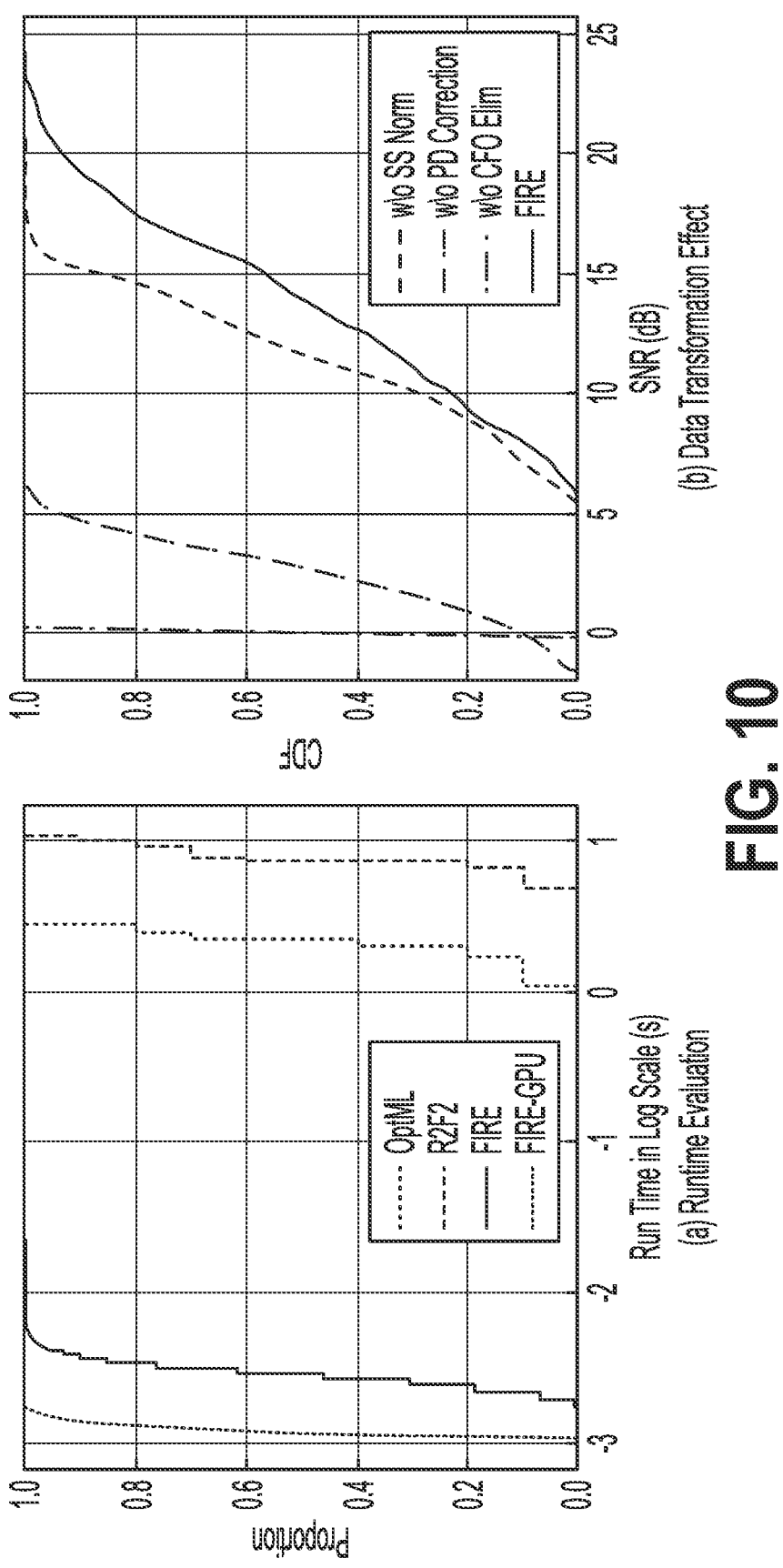
FIG. 10 depicts runtime aspects, in accordance with example embodiments.
Figure 10:
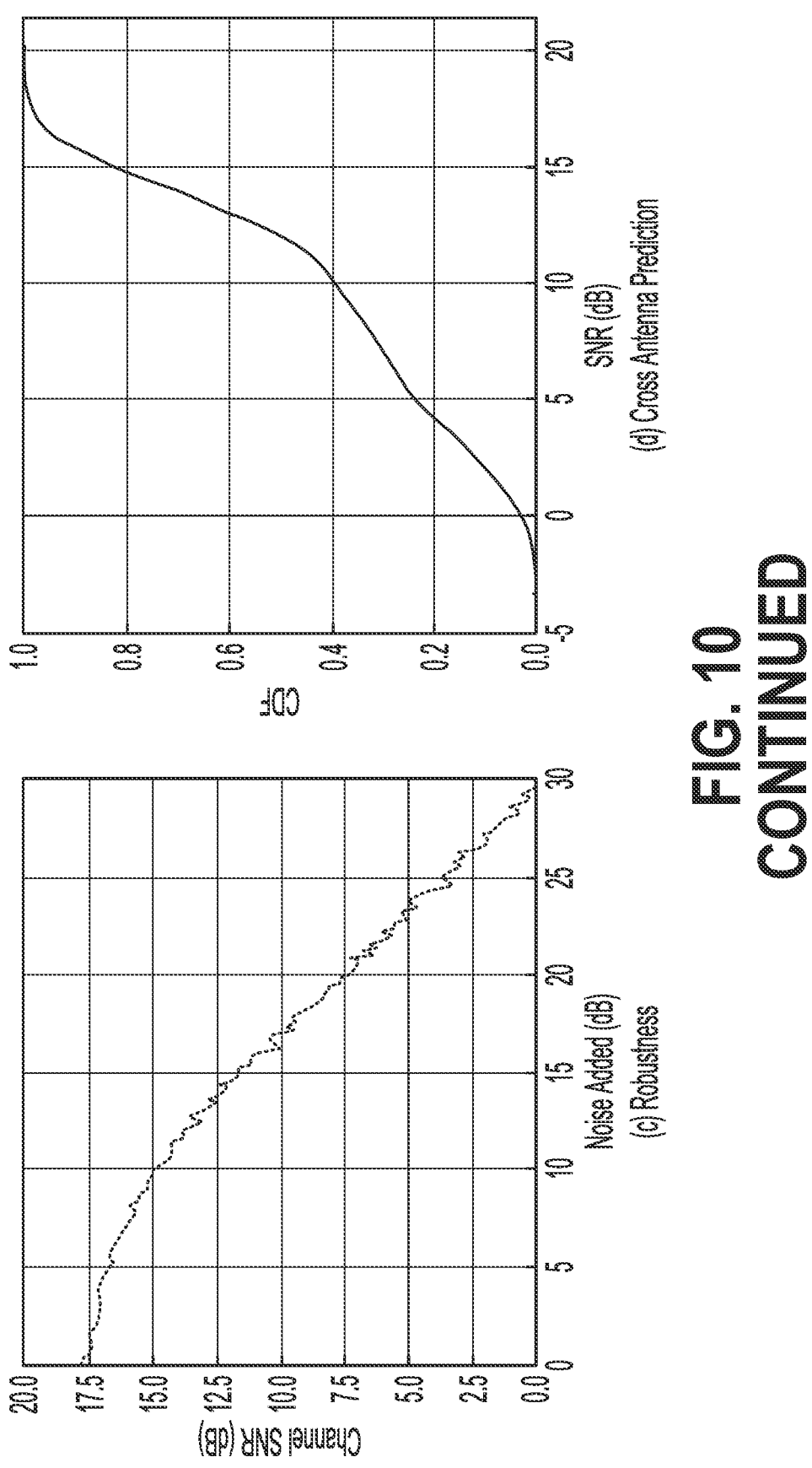

For a channel prediction system to be useful, it must achieve runtime lower than channel coherence time (2.5 ms to 50 ms, see above). FIRE's runtime is analyzed and compared against the different baselines. All algorithms are tested using the same CPU (Intel i7-9750H) and the results are plotted in part (a) of FIG. 10. FIRE has an average run time of 3 ms, which is suitable for rapid cross-band channel estimation even in fast changing environment. FIRE achieves three orders of magnitude reduction compared to prior work primarily because prior work relies on numerical optimization for each prediction, which involves multiple matrix inversions at each step. FIRE, on the other hand, uses a neural network that performs a simple forward pass with simple multiplications. It is envisioned that as modern base stations move their physical layer processing to the cloud and can leverage specialized computational infrastructure like GPUs, FIRE's runtime can be reduced to sub-millisecond levels.

TABLE 1

| Batch Size | 1 | 2 | 4 | 8 | 16 | 32 | 64 |
|---|---|---|---|---|---|---|---|
| Runtime in ms | 1.30 | 0.80 | 0.51 | 0.38 | 0.33 | 0.30 | 0.40 |

The FIRE runtime on the RTX 2070MQ GPU was also tested. The median run time was 1.30 ms for a batch size of 1. A standard base station can perform channel translation for multiple clients together and use a larger batch size. As the batch size is increased (see Table 1), the runtime decreases to sub-millisecond durations (e.g., 0.30 ms with batch size 32) due to the benefits of parallelization. The runtime increases when batch size gets too large, i.e., 64 in this experiment, due to the limit on GPU memory. Finally, note that this runtime includes time for both steps: data transformation (to remove CFO and packet detection delay effect) and channel prediction.

The impact of the data transformation approach described above on FIRE's performance was tested. To achieve this, each of the preprocessing steps was removed and the SNR of the predicted channel was measured. Results are provided in part (b) of FIG. 10. As shown, removing the signal strength normalization (SS Norm) reduces the median channel SNR from 13.90 dB to 11.66 dB, removing the CFO elimination (CFO Elim) step reduces the channel SNR to 0.01 dB, and removing the packet detection delay correction (PD Corr) reduces the channel SNR to 2.70 dB. This indicates that each of the proposed preprocessing steps improves FIRE's performance.

The robustness of FIRE is analyzed by adding Gaussian noise to the uplink channel and then testing the accuracy of the predicted downlink channel. Note that the uplink channel is typically measured for signals with SNR in the range 20 to 30 dB. Additional noise is added to stress-test the system. For each noise value, the results are computed on 100 data points in NLOS datasets. The results are shown in part (c) of FIG. 10. As the noise in uplink channel increases, the predicted channel SNR decreases gracefully. 20 dB of additional noise decreases the performance from 17.6 dB to 7.5 dB. At around, 30 dB additional noise, the channel SNR goes down to zero. This shows that FIRE's channel prediction accuracy is limited by the overall SNR of the system, but degrades gracefully and provides meaningful predictions even in harsh channel conditions.

To evaluate FIRE further, its architecture is used for other channel prediction tasks. Particularly, it is possible to reduce the channel measurement burden even further by predicting channel values across antennas. Specifically, uplink channel measurements on a set of 8 antennas are used to predict downlink channel measurement at a different set of 8 antennas on the same base station. A combination of LOS and NLOS data for training is used. The achieved SNR is shown in part (d) of FIG. 10. FIRE achieves a favorable median SNR of 11.95 dB. While the channel SNR is insufficient for MU-MIMO but can support accurate beamforming. Note that this task cannot be done by any other optimization-based baselines or codebook, which at least need the observed uplink at the same set of antenna. This result shows the potential of FIRE, in that it can complete the downlink channel matrix at the base station even if some antennas miss the uplink channel values.

In these or additional implementations, it may be possible to predict channels from other channels with the same directionality across two different subsets of antennas. For example, assume that a base station is equipped with 8 antennas. The embodiments described herein can predict the uplink or downlink channels at antennas 5 to 8 based on observed uplink channels at antennas 1 to 4. Similarly, these embodiments can predict downlink channels at antennas 5 to 8, given observed downlink channels at antennas 1 to 4.

In general, this means that uplink channel observations on one subset of antennas can be used to predict: (1) uplink channels for a different subset of antennas, (2) downlink channels for the same subset of antennas, and/or (3) downlink channels for a different subset of antennas. Likewise, downlink channels observed or predicted for one subset of antennas can also be used to predict downlink channels for a different subset of antennas This cross-antenna prediction can further reduce the overhead and complexity of channel prediction. For example, rather than needing to receive uplink channel characteristics for all antennas in a set, the uplink channel characteristics of a subset of the antennas can be used to predict the uplink channel characteristics of the remaining antennas as well as downlink channels for all antennas.

Notably, the subsets of antennas may all be placed on the same base station or spread across multiple base stations in the same general location.

VI. Example Operations

FIGS. 11A, 11B, 11C, and 11D are flow charts illustrating respective example embodiments. The processes illustrated by FIGS. 11A, 11B, 11C, and 11D may be carried out by a computing device, such as computing device 100, and/or a cluster of computing devices, such as server cluster 200. However, the processes can be carried out by other types of devices or device subsystems.

The embodiments of FIGS. 11A, 11B, 11C, and 11D may be simplified by the removal of any one or more of the features shown therein. Further, these embodiments may be combined with one another, as well as features, aspects, and/or implementations of any of the previous figures or otherwise described herein.

Block 1100 of FIG. 11A involves obtaining a training data set comprising uplink characteristics and downlink characteristics for a plurality of wireless channels, wherein uplink channels in the plurality of wireless channels are respectively associated with downlink channels in the plurality of wireless channels, and wherein instances of the uplink channels and the downlink channels that are associated operate on different frequencies.

Block 1102 involves iteratively training a neural network with the uplink characteristics and the downlink characteristics, wherein the neural network is configured to: receive the uplink characteristics at an encoder, produce a latent vector representation of the uplink characteristics by way of the encoder, and produce a prediction of the downlink characteristics from the latent vector representation by way of a decoder.

In some embodiments, the neural network is also configured to apply a loss function that seeks to maximize a log likelihood of the prediction of the downlink characteristics given the uplink characteristics.

In some embodiments, the loss function is based on a mean squared error calculation between the prediction of the downlink characteristics and the downlink characteristics, wherein the loss function is also based on a KL divergence calculation between a distribution of the latent vector representation and a multivariate normal distribution.

In some embodiments, there is a pairwise relationship between the uplink channels and the downlink channels that are associated with one another.

In some embodiments, each of the uplink characteristics and the downlink characteristics are represented by one or more complex numbers representing physical channel properties.

In some embodiments, each of the uplink characteristics and the downlink characteristics include subchannel characteristics for a plurality of orthogonal frequency division multiplex subchannels within the uplink channels and the downlink channels.

In some embodiments, the uplink characteristics and the downlink characteristics were collected from measurements performed on a multiple-input multiple-output (MIMO) wireless system.

In some embodiments, a structure of the neural network is based on a variational autoencoder.

In some embodiments, the latent vector representation is of lower dimensionality than each of the uplink characteristics and the downlink characteristics.

In some embodiments, the encoder learns a distribution of the latent vector representation based on the uplink characteristics, wherein the decoder samples the distribution to produce the prediction of the downlink characteristics.

In some embodiments, iteratively training the neural network comprises normalizing the uplink characteristics and the downlink characteristics by: a square root of a number of base station antennas divided by a second order Frobenius norm of the uplink characteristics and the downlink characteristics.

In some embodiments, iteratively training the neural network comprises flattening the uplink characteristics into a vector before providing them to the encoder, wherein the encoder is a multi-layer network using a ReLU-based activation function for at least some of its layers.

In some embodiments, the decoder is a multi-layer network using a ReLU-based activation function or a Tanh-based activation function for at least some of its layers.

Block 1110 of FIG. 11B involves receiving, at a node of a radio access network, input signals on a plurality of wireless channels, wherein uplink channels in the plurality of wireless channels are respectively associated with downlink channels in the plurality of wireless channels, and wherein instances of the uplink channels and the downlink channels that are associated operate on different frequencies.

Block 1112 involves determining, from the input signals, uplink characteristics for the uplink channels.

Block 1114 involves providing, to a trained neural network, the uplink characteristics, wherein the trained neural network was iteratively trained, with a training data set of recorded uplink characteristics and recorded downlink characteristics, to form predictions of the recorded downlink characteristics from the recorded uplink characteristics, wherein the trained neural network includes an encoder that maps the recorded uplink characteristics to latent vector representations, and a decoder that maps the latent vector representations to the predictions of the recorded downlink characteristics.

Block 1116 involves receiving, from the trained neural network, a prediction of downlink characteristics for the downlink channels.

Block 1118 involves transmitting, on the downlink channels, output signals based on the prediction of downlink characteristics.

In some embodiments, the trained neural network includes a loss function that seeks to maximize a log likelihood of the predictions of the recorded downlink characteristics given the recorded uplink characteristics.

In some embodiments, the loss function is based on a mean squared error calculation between the prediction of the recorded downlink characteristics and the recorded downlink characteristics, wherein the loss function is also based on a KL divergence calculations between a distribution of the latent vector representations and a multivariate normal distribution.

In some embodiments, the node of the radio access network is a base station.

In some embodiments, the trained neural network is executed by the node of the radio access network.

In some embodiments, the trained neural network is executed by one or more computing devices within a cloud infrastructure communicatively accessible to the radio access network.

In some embodiments, there is a pairwise relationship between the uplink channels and the downlink channels that are associated with one another.

In some embodiments, each of the recorded uplink characteristics and the recorded downlink characteristics are represented by one or more complex numbers representing physical channel properties.

In some embodiments, each of the recorded uplink characteristics and the recorded downlink characteristics include subchannel characteristics for a plurality of orthogonal frequency division multiplex subchannels within the uplink channels and the downlink channels.

In some embodiments, the recorded uplink characteristics and the recorded downlink characteristics were collected from measurements performed on a multiple-input multiple-output (MIMO) wireless system.

In some embodiments, a structure of the trained neural network is based on a variational autoencoder.

In some embodiments, the latent vector representations are of lower dimensionality than each of the recorded uplink characteristics and the recorded downlink characteristics.

In some embodiments, the encoder is a multi-layer network using a ReLU-based activation function for at least some of its layers.

In some embodiments, the decoder is a multi-layer network using a ReLU-based activation function or a Tanh-based activation function for at least some of its layers.

In some embodiments, the prediction of the downlink characteristics is made without receiving, by way of the uplink channels, representations of the downlink characteristics.

Block 1120 of FIG. 11C involves obtaining a training data set comprising uplink characteristics for a plurality of wireless channels.

Block 1122 involves iteratively training a neural network with a first subset of the uplink characteristics and a second subset of the uplink characteristics, wherein the neural network is configured to: receive the first subset of the uplink characteristics at an encoder, produce a latent vector representation of the first subset of the uplink characteristics by way of the encoder, and produce a prediction of the second subset of the uplink characteristics from the latent vector representation by way of a decoder.

In some embodiments, the first subset of the uplink characteristics and the second subset of the uplink characteristics are for wireless channels that are respectively associated with disjoint subsets of antennas at a base station.

Block 1130 of FIG. 11D involves receiving, at a node of a radio access network, input signals on a plurality of wireless uplink channels associated with a first subset of antennas.

Block 1132 involves determining, from the input signals, uplink characteristics for the wireless uplink channels.

Block 1134 involves providing, to a trained neural network, the uplink characteristics, wherein the trained neural network was iteratively trained, with a training data set of recorded wireless channel characteristics, to form predictions of further wireless channel characteristics from the recorded wireless channel characteristics, and wherein the trained neural network includes an encoder that maps the recorded wireless channel characteristics to latent vector representations, and a decoder that maps the latent vector representations to the predictions of the further wireless channel characteristics.

Block 1136 involves receiving, from the trained neural network, a prediction of wireless channel characteristics associated with a second subset of antennas.

Block 1138 involves communicating, by way of the second subset of antennas, in accordance with the wireless channel characteristics associated with the second subset of antennas.

In some embodiments, the prediction of wireless channel characteristics associated with the second subset of antennas is for further wireless uplink channels associated with the second subset of antennas, wherein communicating in accordance with the wireless channel characteristics associated with the second subset of antennas comprises: receiving further input signals by way of the further wireless uplink channels; and modifying the further input signals based on the prediction of wireless channel characteristics associated with the second subset of antennas.

In some embodiments, the prediction of wireless channel characteristics associated with the second subset of antennas is for wireless downlink channels associated with the second subset of antennas, wherein communicating in accordance with the wireless channel characteristics associated with the second subset of antennas comprises: transmitting, on the wireless downlink channels, output signals based on the prediction of wireless channel characteristics associated with the second subset of antennas.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   receiving, at a node of a radio access network, input signals on a plurality of wireless channels, wherein uplink channels in the plurality of wireless channels are respectively associated with downlink channels in the plurality of wireless channels, and wherein instances of the uplink channels and the downlink channels that are associated operate on different frequencies;
   determining, from the input signals, uplink characteristics for the uplink channels;
   providing, to a trained neural network, the uplink characteristics, wherein the trained neural network was iteratively trained, with a training data set of recorded uplink characteristics and recorded downlink characteristics, to form predictions of the recorded downlink characteristics from the recorded uplink characteristics, and wherein the trained neural network includes an encoder that maps the recorded uplink characteristics to latent vector representations, and a decoder that maps the latent vector representations to the predictions of the recorded downlink characteristics;
   receiving, from the trained neural network, a prediction of downlink characteristics for the downlink channels; and
   transmitting, on the downlink channels, output signals based on the prediction of downlink characteristics.

2. The computer-implemented method of claim 1, wherein the trained neural network includes a loss function that seeks to maximize a log likelihood of the predictions of the recorded downlink characteristics given the recorded uplink characteristics.

3. The computer-implemented method of claim 2, wherein the loss function is based on a mean squared error calculation between the prediction of the recorded downlink characteristics and the recorded downlink characteristics, and wherein the loss function is also based on a KL divergence calculations between a distribution of the latent vector representations and a multivariate normal distribution.

4. The computer-implemented method of claim 1, wherein the node of the radio access network is a base station.

5. The computer-implemented method of claim 1, wherein the trained neural network is executed by the node of the radio access network.

6. The computer-implemented method of claim 1, wherein the trained neural network is executed by one or more computing devices within a cloud infrastructure communicatively accessible to the radio access network.

7. The computer-implemented method of claim 1, wherein there is a pairwise relationship between the uplink channels and the downlink channels that are associated with one another.

8. The computer-implemented method of claim 1, wherein each of the recorded uplink characteristics and the recorded downlink characteristics are represented by one or more complex numbers representing physical channel properties.

9. The computer-implemented method of claim 1, wherein each of the recorded uplink characteristics and the recorded downlink characteristics include subchannel characteristics for a plurality of orthogonal frequency division multiplex subchannels within the uplink channels and the downlink channels.

10. The computer-implemented method of claim 1, wherein the recorded uplink characteristics and the recorded downlink characteristics were collected from measurements performed on a multiple-input multiple-output (MIMO) wireless system.

11. The computer-implemented method of claim 1, wherein a structure of the trained neural network is based on a variational autoencoder.

12. The computer-implemented method of claim 1, wherein the latent vector representations are of lower dimensionality than each of the recorded uplink characteristics and the recorded downlink characteristics.

13. The computer-implemented method of claim 1, wherein the encoder is a multi-layer network using a ReLU-based activation function for at least some of its layers.

14. The computer-implemented method of claim 1, wherein the decoder is a multi-layer network using a ReLU-based activation function or a Tanh-based activation function for at least some of its layers.

15. The computer-implemented method of claim 1, wherein the prediction of the downlink characteristics is made without receiving, by way of the uplink channels, representations of the downlink characteristics.

16. The computer-implemented method of claim 1, wherein transmitting the output signals based on the prediction of downlink characteristics comprises:
   determining a precoding matrix for the downlink channels based on a right pseudo-inverse of the prediction of downlink characteristics.

17. An article of manufacture including a non-transitory computer-readable medium, having stored thereon program instructions that, upon execution by a computing system, cause the computing system to perform operations comprising:
   receiving, at a node of a radio access network, input signals on a plurality of wireless channels, wherein uplink channels in the plurality of wireless channels are respectively associated with downlink channels in the plurality of wireless channels, and wherein instances of the uplink channels and the downlink channels that are associated operate on different frequencies;

determining, from the input signals, uplink characteristics for the uplink channels;

providing, to a trained neural network, the uplink characteristics, wherein the trained neural network was iteratively trained, with a training data set of recorded uplink characteristics and recorded downlink characteristics, to form predictions of the recorded downlink characteristics from the recorded uplink characteristics, and wherein the trained neural network includes an encoder that maps the recorded uplink characteristics to latent vector representations, and a decoder that maps the latent vector representations to the predictions of the recorded downlink characteristics;

receiving, from the trained neural network, a prediction of downlink characteristics for the downlink channels; and transmitting, on the downlink channels, output signals based on the prediction of downlink characteristics.

18. A computer-implemented method comprising:

receiving, at a node of a radio access network, input signals on a plurality of wireless uplink channels associated with a first subset of antennas;

determining, from the input signals, uplink characteristics for the wireless uplink channels;

providing, to a trained neural network, the uplink characteristics, wherein the trained neural network was iteratively trained, with a training data set of recorded wireless channel characteristics, to form predictions of further wireless channel characteristics from the recorded wireless channel characteristics, and wherein the trained neural network includes an encoder that maps the recorded wireless channel characteristics to latent vector representations, and a decoder that maps the latent vector representations to the predictions of the further wireless channel characteristics;

receiving, from the trained neural network, a prediction of wireless channel characteristics associated with a second subset of antennas; and communicating, by way of the second subset of antennas, in accordance with the wireless channel characteristics associated with the second subset of antennas.

19. The computer-implemented method of claim 18, wherein the prediction of wireless channel characteristics associated with the second subset of antennas is for further wireless uplink channels associated with the second subset of antennas, and wherein communicating in accordance with the wireless channel characteristics associated with the second subset of antennas comprises:

receiving further input signals by way of the further wireless uplink channels; and modifying the further input signals based on the prediction of wireless channel characteristics associated with the second subset of antennas.

20. The computer-implemented method of claim 18, wherein the prediction of wireless channel characteristics associated with the second subset of antennas is for wireless downlink channels associated with the second subset of antennas, and wherein communicating in accordance with the wireless channel characteristics associated with the second subset of antennas comprises:

transmitting, on the wireless downlink channels, output signals based on the prediction of wireless channel characteristics associated with the second subset of antennas.

* * * * *